US011627523B2

(12) United States Patent
Ma

(10) Patent No.: US 11,627,523 B2
(45) Date of Patent: *Apr. 11, 2023

(54) COMMUNICATION APPARATUS AND COMMUNICATION METHOD

(71) Applicant: SONY GROUP CORPORATION, Tokyo (JP)

(72) Inventor: Yuelin Ma, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 17/223,541

(22) Filed: Apr. 6, 2021

(65) Prior Publication Data

US 2021/0227459 A1 Jul. 22, 2021

Related U.S. Application Data

(63) Continuation of application No. 16/347,112, filed as application No. PCT/JP2017/039548 on Nov. 1, 2017, now Pat. No. 11,026,167.

(30) Foreign Application Priority Data

Dec. 20, 2016 (JP) .................................. 2016-246456

(51) Int. Cl.
*H04W 48/20* (2009.01)
*H04B 17/327* (2015.01)
(Continued)

(52) U.S. Cl.
CPC .......... *H04W 48/20* (2013.01); *H04B 17/327* (2015.01); *H04B 17/345* (2015.01);
(Continued)

(58) Field of Classification Search
None
See application file for complete search history.

(56) References Cited

U.S. PATENT DOCUMENTS 6,400,955 B1    6/2002  Kawabata et al.
2009/0186609 A1  7/2009  Wu et al.
(Continued)

FOREIGN PATENT DOCUMENTS

CN    107743722 A    2/2018
EP      2849526 A2    3/2015
(Continued)

OTHER PUBLICATIONS

Office Action for RU Patent Application No. 20190118265, dated Dec. 21, 2021.
(Continued)

*Primary Examiner* — Saumit Shah
(74) *Attorney, Agent, or Firm* — Chip Law Group

(57) ABSTRACT

A communication apparatus is provided that performs packet transmission at the time of detecting an interference signal. Each STA records a pair of a measurement result of an RSSI of an OBSS and a BSS Color, and reports, to an AP, BSS Colors that correspond to a maximum value and a minimum value of the RSSI. The AP generates a database or a table by using a STA having a minimum or maximum RSSI for each of the OBSS's. When a signal of an OBSS is detected, the AP selects a STA that has the smallest RSSI of the OBSS or does not have the largest RSSI of the OBSS, and performs SR transmission. Alternatively, the AP measures angles of arrival of STAs and OBSS's. When a signal of an OBSS is detected, the AP selects a STA that is most different in the angle of arrival from the OBSS or is not most similar in the angle of arrival to the OBSS, and performs SR transmission.

17 Claims, 20 Drawing Sheets

(51) Int. Cl.
*H04B 17/345* (2015.01)
*H04W 16/02* (2009.01)
*H04W 16/14* (2009.01)
*H04W 48/16* (2009.01)
*H04W 84/12* (2009.01)
*H04W 74/08* (2009.01)

(52) U.S. Cl.
CPC ............ *H04W 16/02* (2013.01); *H04W 16/14* (2013.01); *H04W 48/16* (2013.01); *H04W 74/08* (2013.01); *H04W 84/12* (2013.01)

(56) References Cited

U.S. PATENT DOCUMENTS

| | | | |
|---|---|---|---|
| 2015/0045049 | A1 | 2/2015 | Sawai |
| 2015/0078259 | A1 | 3/2015 | Junior et al. |
| 2015/0078299 | A1 | 3/2015 | Barriac et al. |
| 2015/0264617 | A1 | 9/2015 | Choudhury et al. |
| 2015/0359008 | A1 | 12/2015 | Wang et al. |
| 2016/0143058 | A1 | 5/2016 | Son et al. |
| 2016/0174079 | A1 | 6/2016 | Wang et al. |
| 2016/0174253 | A1 | 6/2016 | Liu et al. |
| 2017/0150492 | A1 | 5/2017 | Ozaki |
| 2017/0223710 | A1* | 8/2017 | Cariou ................ H04W 52/247 |
| 2018/0132278 | A1 | 5/2018 | Oteri et al. |
| 2018/0242373 | A1 | 8/2018 | Wang et al. |
| 2019/0053062 | A1* | 2/2019 | Wang ................ H04W 52/243 |

FOREIGN PATENT DOCUMENTS

| | | | |
|---|---|---|---|
| EP | 2944140 | A1 | 11/2015 |
| EP | 3289821 | A1 | 3/2018 |
| EP | 3301983 | A1 | 4/2018 |
| JP | 2000-059287 | A | 2/2000 |
| JP | 2006-197559 | A | 7/2006 |
| JP | 2011-259126 | A | 12/2011 |
| JP | 2016-028465 | A | 2/2016 |
| JP | 2016-507183 | A | 3/2016 |
| JP | 2016-524377 | A | 8/2016 |
| JP | 2016-536933 | A | 11/2016 |
| JP | 2017-530610 | A | 10/2017 |
| JP | 6437923 | B2 | 12/2018 |
| RU | 2474980 | C2 | 2/2013 |
| TW | 201436610 | A | 9/2014 |
| WO | 2007/143753 | A2 | 12/2007 |
| WO | 2009/065075 | A1 | 5/2009 |
| WO | 2014/110397 | A1 | 7/2014 |
| WO | 2015/174725 | A1 | 11/2015 |
| WO | 2016/024356 | A1 | 2/2016 |
| WO | 2016/112306 | A1 | 7/2016 |
| WO | 2016/176110 | A1 | 11/2016 |

OTHER PUBLICATIONS

Search Report and Written Opinion of Singapore Application No. 11201904292T, dated Jun. 2, 2020, 15 pages of Search Report and Written Opinion.
International Search Report and Written Opinion of PCT Application No. PCT/JP2017/039548, dated Jan. 23, 2018, 10 pages of English Translation and 09 pages of ISRWO.
Extended European Search Report of EP Application No. 17884916.2, dated Nov. 7, 2019, 09 pages.
Son, et al., "Further Considerations on Enhanced CCA for 11ax", IEEE 802.11-14/0847r1, vol. 802. 11ax, No. 1, XP068069563, Jul. 15, 2014, 12 pages.
Notice of Allowance for U.S. Appl. No. 16/347,112, dated Apr. 9, 2021, 2 pages.
Notice of Allowance for U.S. Appl. No. 16/347,112, dated Dec. 28, 2020, 8 pages.
Non-Final Office Action for U.S. Appl. No. 16/347,112, dated Aug. 21, 2020, 15 pages.
International Preliminary Report on Patentability of PCT Application No. PCT/JP2017/039548, dated Jun. 25, 2019, 11 pages of English Translation and 06 pages of IPRP.
Office Action for JP Patent Application No. 2018-557587, dated Nov. 30, 2021, 04 pages of English Translation and 04 pages of Office Action.

* cited by examiner

FIG. 8

|  | OBSS1 | OBSS2 | OBSS3 | OBSS4 |
|---|---|---|---|---|
| Min RSSI | STA2, STA4 | STA1 | STA3 |  |
| Max RSSI | STA3 | STA2 | STA4 | STA1 |

FIG. 18

| Cluster1 | Cluster2 | Cluster3 | Cluster4 |
|---|---|---|---|
| STA1, STA3 OBSS1 | | STA2 OBSS2 | STA4 |

COMMUNICATION APPARATUS AND COMMUNICATION METHOD

CROSS REFERENCE TO RELATED APPLICATIONS

This application is continuation application of U.S. patent application Ser. No. 16/347,112, filed May 2, 2019, which is a U.S. National Phase of International Patent Application No. PCT/JP2017/039548 filed Nov. 1, 2017, which claims priority benefit of Japanese Patent Application No. JP 2016-246456 filed in the Japan Patent Office on Dec. 20, 2016. Each of the above-referenced applications is hereby incorporated herein by reference in its entirety.

TECHNICAL FIELD

A technology disclosed herein relates to a communication apparatus and a communication method that are capable of performing transmission processing in a state of detecting an interference signal (such as a signal that arrives from an adjacent cell).

BACKGROUND ART

IEEE 802.11 serving as one example of a representative standard for a wireless LAN defines carrier sense multiple access/collision avoidance (CSMA/CA) as a mechanism in which each terminal station autonomously acquires a transmission opportunity. Specifically, a terminal station performs transmission standby (backoff) during a random time period, and observes ambient radio wave environment (performs carrier sensing) during this backoff. When the terminal station detects radio waves having a power that is greater than or equal to a certain detection threshold, the terminal station stops backoff, and suppresses transmission of a packet. Due to this mechanism of backoff and carrier sensing, the terminal station avoids packet collision while acquiring a transmission opportunity in an autonomous distributed manner.

However, in an environment in which many terminal stations exist in high density, if the detection of radio waves and the avoidance of collision that are described above are performed by using a detection threshold set according to the IEEE 802.11 standard, for example, a signal that has been transmitted from a terminal station that belongs to an adjacent cell is detected, and transmission is suppressed excessively or unnecessarily. Such a case has been regarded as a problem. Note that the "cell" described above is equivalent to, for example, a basic service set (BSS) that a base station configures together with terminal stations under control. Furthermore, the adjacent cell is equivalent to another BSS having an overlapping receivable range (hereinafter also referred to as an "overlapping basic service set (OBSS)").

Accordingly, for example, in IEEE 802.11ax serving as one example of a next-generation wireless LAN standard, a spatial reuse (SR) technology has been being examined in which adjacent cells reuse a single frequency channel and frequency resources are efficiently used. Specifically, even if terminal stations in cells adjacent to each other detect a signal from each other, the terminal stations are enabled to transmit their own packets. The SR technology described above can be realized by describing a simplified BSS identifier called a "BSS Color" in a PHY header of a packet so as to enable a reception side to discriminate a signal (hereinafter also referred to as a "local-cell signal") of a BSS (the local cell) that the reception side belongs to from a signal (hereinafter also referred to as an "adjacent-cell signal") from an OBSS (an adjacent cell) on the basis of the BSS Color described in the PHY header (see, for example, Patent Document 1).

For example, in a case where a terminal station that has received a packet can determine that the packet is an adjacent-cell signal on the basis of the content described in the PHY header, the terminal station interrupts the reception of a packet at this point in time. Moreover, if the reception power of the received signal is less than or equal to a detection threshold (an OBSS-power detection (PD) threshold) of the adjacent-cell signal, the start of backoff is permitted. This enables spatial reuse to be realized. Due to spatial reuse, even if a signal is still being transmitted from the OBSS, an opportunity to transmit a signal to the terminal station increases. This results in improvements in a throughput of the entirety of a system.

Note that, in SR transmission based on the detection of the OBSS-PD threshold, the OBSS-PD threshold is generally adjusted. For example, the terminal station can increase the OBSS-PD threshold by reducing its own transmission power, and can easily acquire a transmission opportunity using spatial reuse by adjusting the transmission power according to interference power.

CITATION LIST

Patent Document

Patent Document 1: Japanese Patent Application Laid-Open No. 2016-28465

SUMMARY OF THE INVENTION

Problems to be Solved by the Invention

It is an object of the technology disclosed herein to provide a communication apparatus and a communication method having high quality that are capable of suitably performing transmission processing in a state of detecting an interference signal.

Solutions to Problems

The technology disclosed herein has been made in consideration of the problems above. A first aspect of the technology disclosed herein is a communication apparatus including:
a communication unit that transmits or receives a signal;
an information obtaining unit that obtains information relating to interference that each transmission destination candidate receives from an interference source; and
a controller that selects each of the transmission destination candidates on the basis of the information when an interference signal arrives.

Furthermore, a second aspect of the technology disclosed herein is a communication method including:
an information obtaining step of obtaining information relating to interference that each transmission destination candidate receives from an interference source; and
a controlling step of selecting each of the transmission destination candidates on the basis of the information when an interference signal arrives.

Furthermore, a third aspect of the technology disclosed herein is a communication apparatus that operates under a control of an access point, the communication apparatus including:

a controller that performs control to transmit, to the access point, information relating to an intensity of a received signal of an OBSS signal.

Effects of the Invention

According to the technology disclosed herein, a communication apparatus and a communication method having high quality can be provided that are capable of suitably performing transmission processing in a state of detecting an interference signal.

Note that effects described herein are merely examples, and effects of the present invention are not limited to the effects described herein. Furthermore, the present invention further exhibits additional effects in addition to the effects described above in some cases.

Yet other objects, features, and advantages of the technology disclosed herein will be clarified by a more detailed description based on the embodiments described later and the attached drawings.

BRIEF DESCRIPTION OF DRAWINGS

FIG. 8 illustrates an example of a table that reflects a rough positional relationship among each STA under the control of the AP, OBSS's, and the AP.

FIG. 18 illustrates an example of a table obtained by dividing STAs and OBSS's into clusters on the basis of an arrival angle.

MODE FOR CARRYING OUT THE INVENTION

Embodiments of the technology disclosed herein are described below in detail with reference to the drawings.

Figure 1:
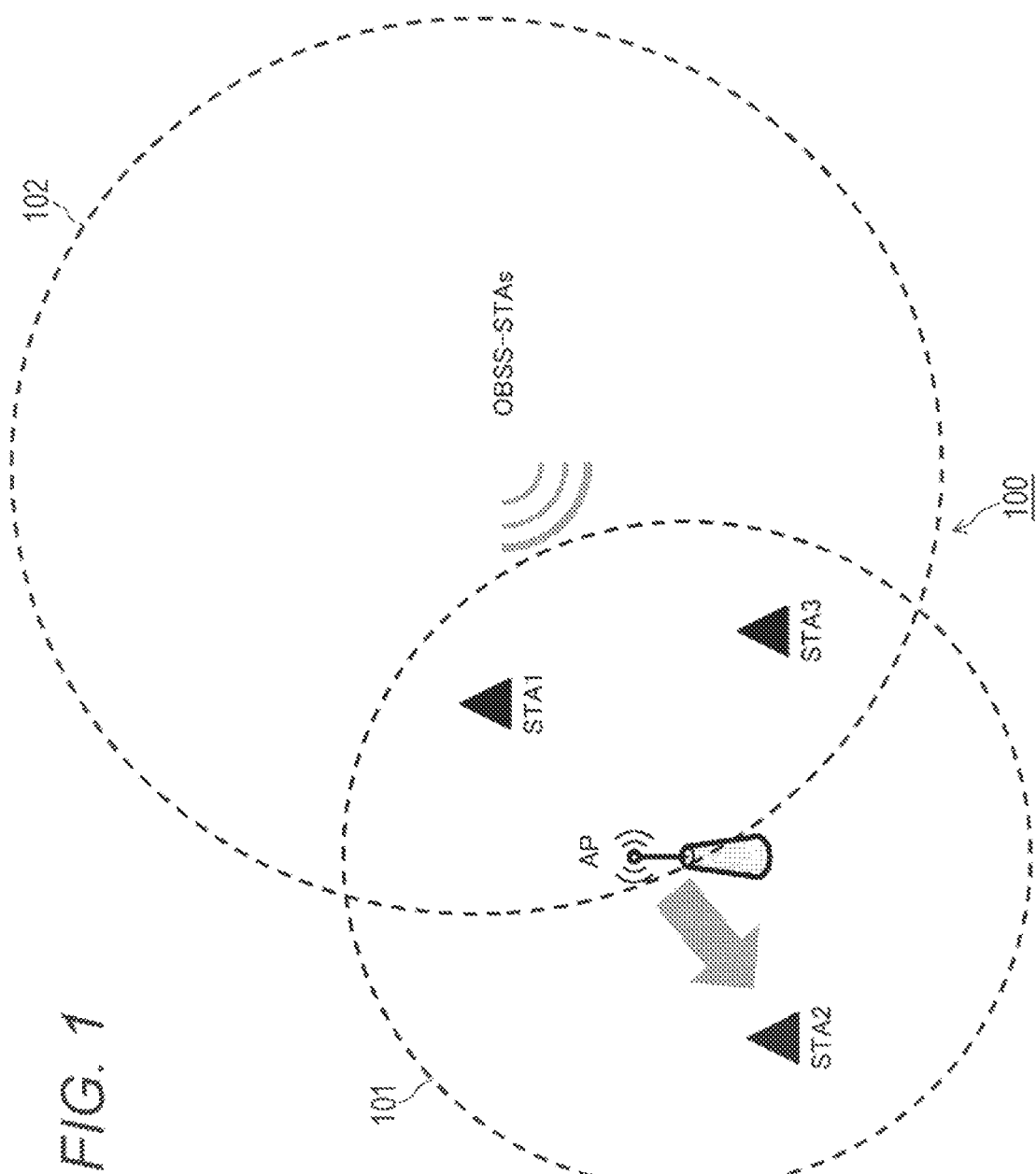
FIG. 1 illustrates an example of an ideal configuration of a wireless LAN system to which SR transmission based on OBSS-PD is applied.

FIG. 1 schematically illustrates an example of an ideal configuration of a wireless LAN system 100 to which SR transmission based on OBSS-PD is applied. The illustrated wireless LAN system 100 includes a plurality of base stations (access points: APs) and a plurality of terminal stations (stations: STAs) among which connection has been established. It is assumed that an interference source such as an adjacent cell or another system exists around the wireless LAN system 100. In the illustrated example, a BSS that an AP configures together with STA 1 to STA 3 under control is denoted by reference number 101. Furthermore, an OBSS (an OBSS-STA) having a receivable range that overlaps a receivable range of the BSS 101 is denoted by reference number 102. From among STA 1 to STA 3 under the control of the AP, STA 1 and STA 3 have a receivable range that overlaps a receivable range of the OBSS 102, but STA 2 does not have a receivable range that overlaps the receivable range of the OBSS 102.

Figure 2:
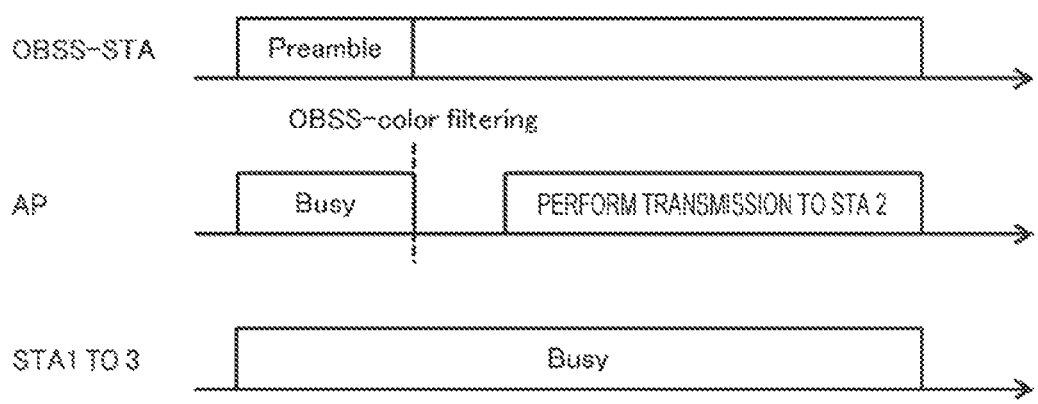
FIG. 2 illustrates an example of a signal transmission sequence in a wireless LAN system 100 illustrated in FIG. 1.

Furthermore, FIG. 2 illustrates an example of a signal transmission sequence in the wireless LAN system 100 illustrated in FIG. 1 (note that a horizontal axis is a time axis). While a STA (an OBSS-STA) in the OBSS 102 is transmitting a signal, STA 1 to STA 3 are set to a busy state and stand by for transmission until the transmission processing of the OBSS-STA is terminated. On the other hand, even if the OBSS-STA does not complete signal transmission, the AP can determine that the AP can transmit a signal to STA 2. This is because STA 2 exists outside the receivable range of the OBSS 102, and does not receive interference or only receives small interference from the OBSS-STA.

By setting an OBSS-PD threshold that is less than the reception power of a signal from the OBSS-STA, the AP returns to an IDLE state (in other words, a non-busy state) after detecting a BSS Color in a PHY header of the received signal, and the AP can start the transmission of a signal to STA 2. In contrast, in a case where the AP transmits a signal to STA 1 rather than STA 2, it is obvious that a signal received by STA 1 is strongly interfered with by the OBSS-STA.

Accordingly, in SR transmission based on OBSS-PD, the key to success is to appropriately select a transmission destination of a signal. However, in practice, a wireless LAN is not a centralized system but is a distributed system, and all of the STAs autonomously perform communication. Therefore, in a case where SR transmission based on OBSS-PD is applied, it is significantly difficult to select an appropriate transmission destination.

SR transmission based on OBSS-PD is defined in the latest IEEE 802.11ax specification, but no prior arts, such as documents, that discuss the dynamic adjustment of an OBSS-PD threshold have not been discovered. In general, if the OBSS-PD threshold is a fixed value, only a limited effect of SR is realized. The most significant obstacle in dynamically utilizing SR transmission based on OBSS-PD is that the AP lacks information relating to interference from the OBSS that each candidate for a transmission destination will receive. Therefore, the AP fails to correctly determine both whether or not a higher OBSS-PD threshold is to be set in order to create a transmission opportunity and which transmission destination a signal is to be transmitted to.

In order to easily perform dynamic SR transmission based on OBSS-PD, a minimum level of information exchange is required. If a report about a result of measuring reception power is added to OBSS information, APs can mutually exchange information relating to OBSS interference that a BSS of the local AP is receiving. By doing this, an AP can grasp a situation of another AP, and this enables the performance of the entirety of a system to be optimized while the respective APs cooperate with each other.

Herein, a method relating to the exchange of information that causes dynamic SR transmission based on OBSS-PD to be easily performed is proposed below.

Example 1

In Example 1, when an AP performs downlink SR transmission based on OBSS-PD, the AP uses a receiving signal strength indicator (RSSI) of an OBSS signal of each STA under control as information for appropriately selecting a transmission destination. The RSSI is information that can almost directly indicates an influence of interference that a STA receives from an OBSS, and the AP can select a more appropriate transmission destination. Furthermore, the AP needs a minimum sequence (overhead) to exchange information relating to the RSSI of the OBSS with each of the STAs under control in order to realize downlink SR transmission based on OBSS-PD.

Figure 3:
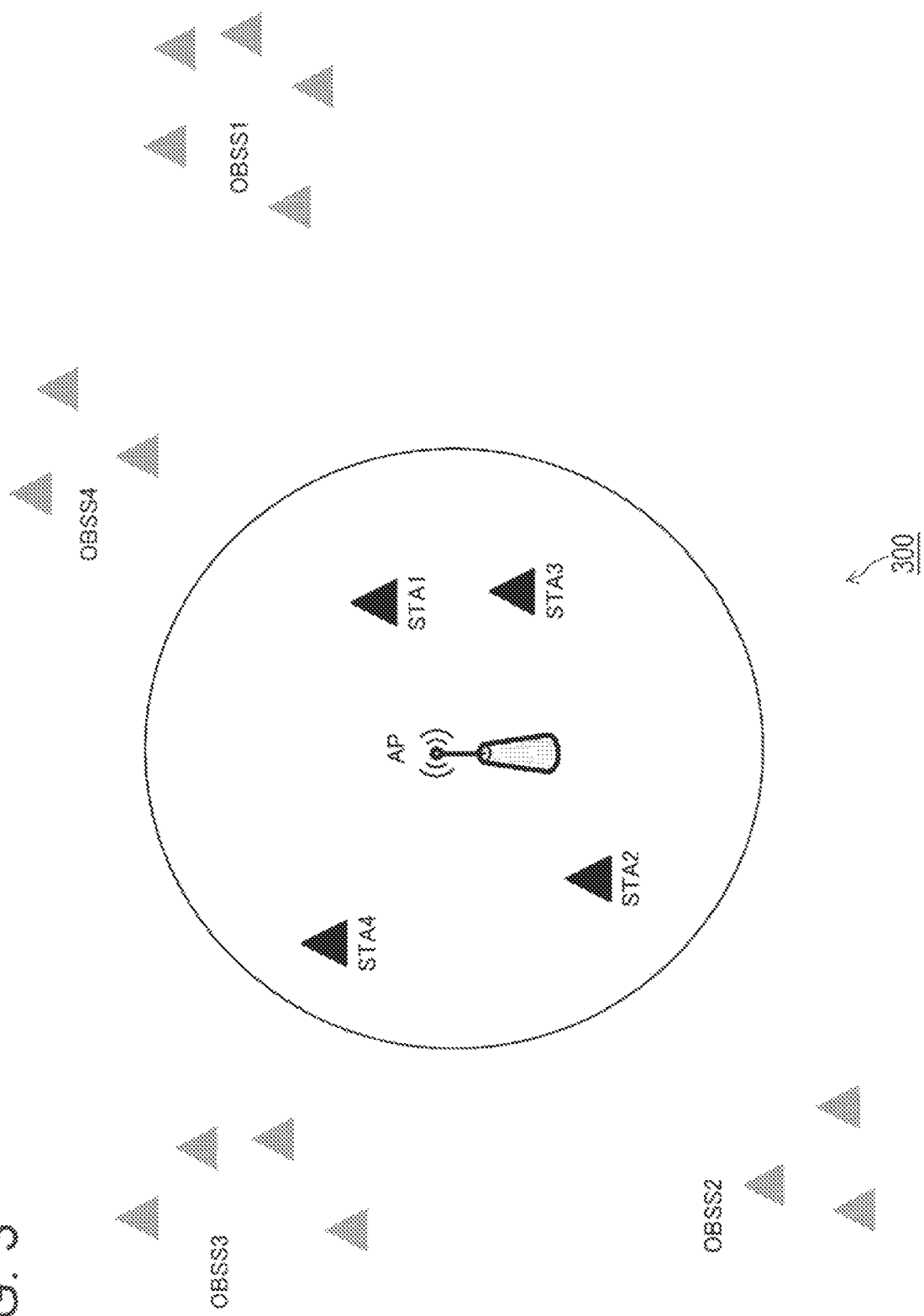
FIG. 3 illustrates an example of a configuration of a wireless LAN system 300.

FIG. 3 illustrates an example of a configuration of a wireless LAN system 300 to which the technology disclosed herein can be applied. In this drawing, an AP configures a single BSS together with STA 1 to STA 4 under control (that are not APs). Furthermore, four OBSS's having an overlapping receivable range exist to be adjacent to this BSS. Assume that (BSS Colors of) the respective OBSS's are OBSS 1, OBSS 2, OBSS 3, and OBSS 4. Example 1 of the technology disclosed herein is described below in detail with appropriate reference to FIG. 3.

When a STA of one of the OBSS's is transmitting a signal and terminal stations (STA 1 to STA 4 and the AP) receive a frame, the terminal stations check the field "BSS Color" in a PHY header of the frame so as to identify whether or not the received frame is a frame that has arrived from the OBSS.

Figure 4:
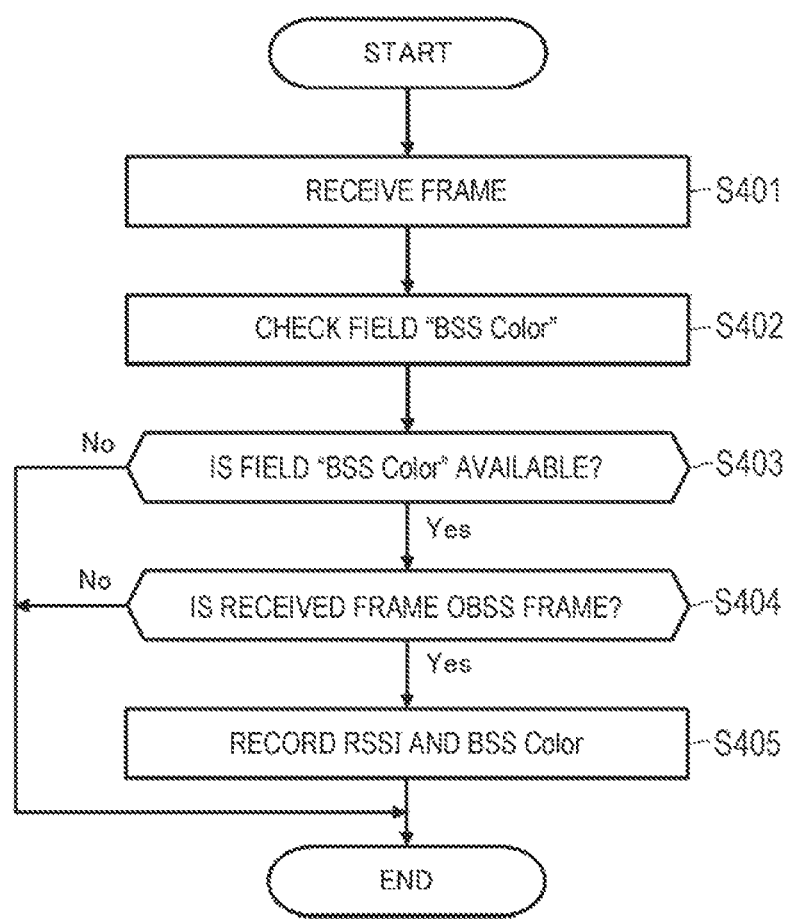
FIG. 4 is a flowchart illustrating a processing procedure performed when a terminal station receives a frame.

FIG. 4 illustrates a processing procedure performed when a terminal station receives a frame in the form of a flowchart.

Upon receipt of a frame (step S401), a terminal station checks the field "BSS Color" in a PHY header of the frame (step S402).

First, the terminal station checks whether or not the field "BSS Color" in the PHY header is available (step S403). In a case where a transmission source of the frame does not conform to IEEE 802.11ax, the field "BSS Color" does not exist in the PHY header, and in other words, the field "BSS Color" is not available.

On the other hand, in a case where the field "BSS Color" in the PHY header is available (Yes in step S403), the terminal station further checks whether or not the received frame is a frame that has arrived from an OBSS on the basis of whether or not a value of the BSS Color is different from a value of the terminal station (step S404).

Then, in a case where the received frame is a frame that has arrived from the OBSS (Yes in step S404), the terminal station records, for example, reception power measured in a preamble portion of the received frame, namely, an RSSI, together with the value of the BSS Color obtained in step S403 (step S405).

When a time period has passed, the terminal station can record RSSI's and BSS Colors from all or most of neighboring OBSS's. However, it is to be noted that a position and an ambient environment of each of the terminal stations change with time, and therefore each of the terminal stations needs to update the information above relating to the OBSS.

Figure 5:
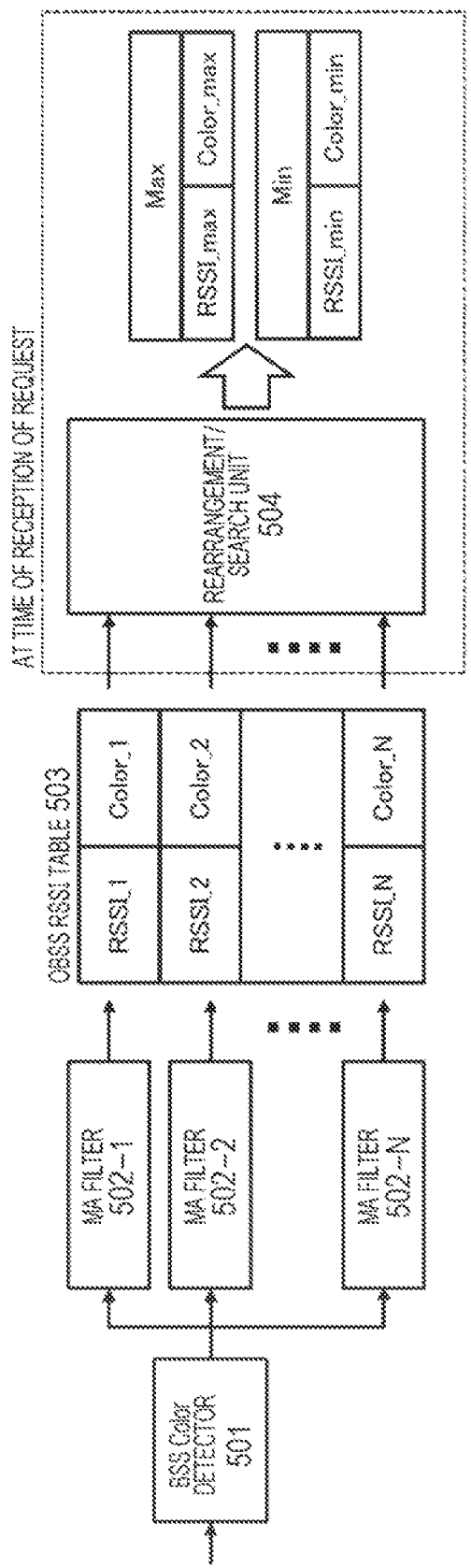
FIG. 5 is a block diagram illustrating an example of implementation for recording reception power and a BSS Color of an OBSS signal.

FIG. 5 illustrates an implementation example of a STA that can realize functionality relating to downlink SR transmission based on OBSS-PD, as described above, by using the valid complexity of hardware in the form of a block diagram.

A BSS Color detector 501 detects a BSS Color described in a PHY header of a frame that has arrived. Whether an arrival signal is a BSS signal or an OBSS signal can be determined on the basis of the detected BSS Color. A bank of moving average (MA) filters 502-1, 502-2, . . . , and 502-N is arranged in order to process an RSSI of a received signal from each of the OBSS's. Once the BSS Color detector 501 specifies the BSS Color of the frame that has arrived, an RSSI of the frame is pushed into a corresponding MA filter 502-1, 502-2, . . . , or 502-N, and an output of the corresponding MA filter is labeled a BSS Color of a corresponding OBSS, and is stored in a table (an OBSS RSSI table) 503.

Even a signal from the same transmitter has a large deviation in reception power in some cases. However, by using the MA filters 502-1 and the like, the effectiveness of the deviation in reception power can be reduced due to fading and shadowing. Additionally, the MA filters 502-1 and the like can track a change in reception power that is generated due to a change in the position or ambient environment of a terminal station, as described above.

Upon receipt of a measurement request from an AP, a STA transmits, to the AP, information stored in the OBSS RSSI table 503. It is to be noted that the number of OBSS's is an indefinite value depending on a situation of a BSS or an individual STA, and it is preferable that minimum information be transmitted instead of all pieces of information stored in the OBSS RSSI table 503.

Accordingly, a rearrangement/search unit 504 rearranges records of the OBSS RSSI table 503 according to the size of the RSSI, extracts, from the OBSS RSSI table 503, maximum value information (Max) that includes a pair of a maximum value (RSSI_max) of the RSSI and a BSS Color (Color_max) of a corresponding OBSS, and minimum value information (Min) that includes a pair of a minimum value (RSSI_min) of the RSSI and a BSS Color (Color_min) of a corresponding OBSS, and transmits the maximum value information and the minimum value information to the AP.

As described above, the AP transmits the measurement request so as to be able to periodically obtain OBSS RSSI information, as described above, from a specified STA (under control) that is not an AP. After the STA under the control of the AP receives a measurement request frame from the AP, the STA checks the OBSS RSSI table 503, and transmits, to the AP, a measurement report frame that includes the maximum value and the minimum value of the RSSI and information relating to respective paired BSS Colors.

Figure 6:
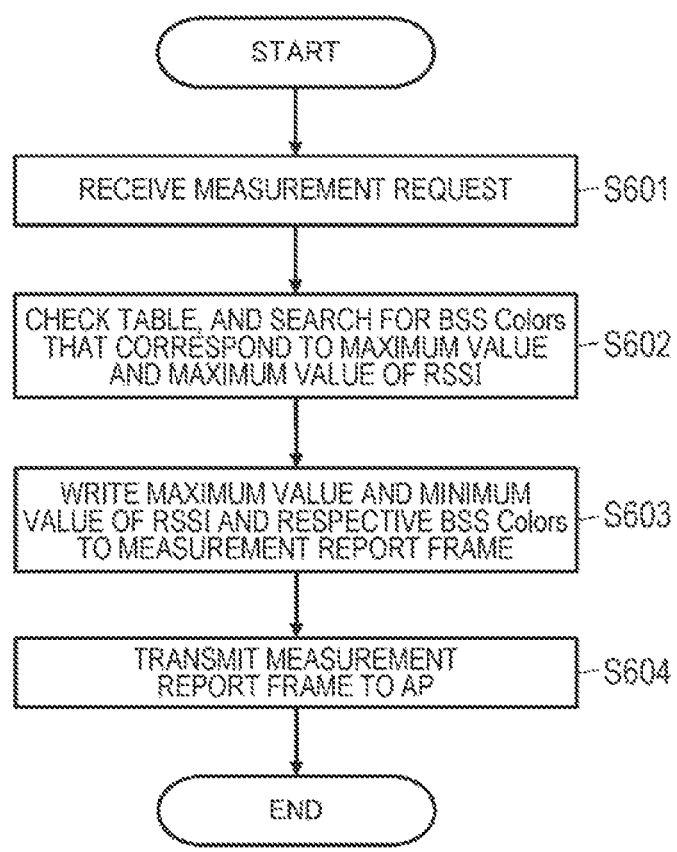
FIG. 6 is a flowchart illustrating a processing procedure for reporting OBSS RSSI information to an AP.

FIG. 6 illustrates a processing procedure in which the STA under the control of the AP reports the OBSS RSSI information to the AP in the form of a flowchart.

Upon receipt of a measurement request from the AP (step S601), the STA under the control of the AP checks the OBSS RSSI table 503 (see FIG. 5), and searches for BSS Colors that respectively correspond to the maximum value and the maximum value of the RSSI (step S602).

Then, the STA writes the maximum value and the minimum value of the RSSI and the respective paired BSS Colors to a measurement report frame (step S603), and transmits the measurement report frame to the AP (step S604).

The number of OBSS's is indefinite and depends on a specified situation, and therefore the size of the OBSS RSSI table 503 is variable. Therefore, it is to be noted that it is preferable that a limited minimum piece of information, rather than the entirety of the table, be transmitted from the STA to the AP. Herein, as described with reference to FIGS. 5 and 6, it is recommended that the STA only transmit, to the AP, the maximum value and the maximum value of the RSSI and the respective BSS Colors that have been recorded.

Figure 7:
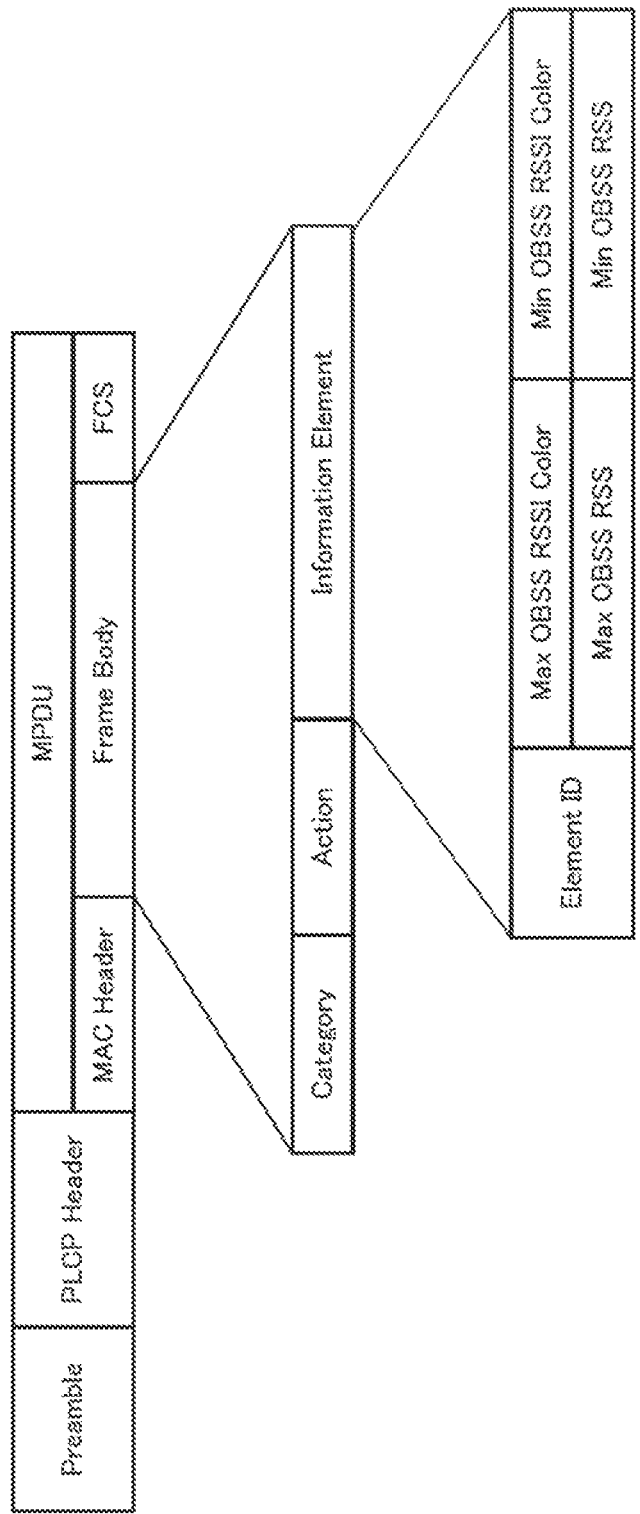
FIG. 7 illustrates an example of a configuration of a measurement report frame.

FIG. 7 illustrates an example of a configuration of the measurement report frame. The frame includes a preamble located at the top, a physical layer convergence protocol (PLCP) header, and an MPDU that is equivalent to a media access control (MAC) frame. Furthermore, the MAC protocol data unit (MPDU) includes a MAC header, a frame body, and a frame check sequence (FCS). In the illustrated frame configuration example, information relating to a measurement report of reception power is described in the frame body of the MPDU.

In the frame body, respective fields, Category, Action, and Information Element, are provided. In the field "Category", a value indicating an action to be performed on this frame is set, and the field "Category" is probably set to 5 in order to mean a frame for wireless measurement. The field "Action" is set to 1, and this indicates a measurement report frame (incidentally, 0 indicates a measurement request frame). In the field "Information Element", OBSS RSSI information that includes a pair of a maximum value (Max OBSS RSSI) of an OBSS RSSI to be reported and color information (Max OBSS RSSI Color) of the maximum value and a pair of a minimum value (Min OBSS RSSI) of the OBSS RSSI and color information (Min OBSS RSSI Color) of the minimum value, and an element ID used to indicate a measurement report (of reception power) are stored. The OBSS RSSI information is information obtained by pairing an RSSI of a signal of an OBSS and a BSS Color of the OBSS, and may further include information that is different from the maximum value and the minimum value of the RSSI that are described above.

Note that the STA may transmit the OBSS RSSI information described above to the AP by using a management frame or an action frame.

After the AP collects the OBSS RSSI information by using the measurement report frames transmitted from all of the STAs in a BSS of the AP, the AP can construct a table or a database that reflects a rough positional relationship among each of the STAs under control, OBSS's, and the AP. FIG. 8 illustrates an example of the table above. In the illustrated table, for each of the OBSS's, a STA (Min RSSI) having a minimum RSSI and a STA (Max RSSI) having a maximum RSSI are listed.

Referring to the network configuration illustrated in FIG. 3, STA 2 and STA 4 are located apart from OBSS 1, and therefore an RSSI from OBSS 1 has a minimum value, and STA 2 and STA 4 are listed in the row "Min RSSI of the column OBSS 1 in the table illustrated in FIG. 8. Furthermore, STA 2 is located closest to OBSS 2, and therefore an RSSI from OBSS 2 has a maximum value, and STA 2 is listed in the row "Max RSSI" of the column "OBSS 2" in the same table. Furthermore, STA 4 is located closest to OBSS 3, and therefore an RSSI from OBSS 3 has a maximum value, and STA 4 is listed in the row "Max RSSI" of the column "OBSS 3" in the same table.

Furthermore, STA 1 is located closest to OBSS 4, an RSSI from OBSS 4 has a maximum value, and STA 1 is listed in the row "Max RSSI" of the column "OBSS 4" in the same table. In addition, STA 1 is located apart from OBSS 2, an RSSI from OBSS 2 has a minimum value, and STA 1 is listed in the row "Min RSSI" of the column "OBSS 2" in the same table.

Furthermore, STA 3 is located closest to OBSS 1, an RSSI from OBSS 1 has a maximum value, and STA 3 is listed in the row "Max RSSI" of the column "OBSS 1" in the same table. In addition, STA 3 is located apart from OBSS 3, an RSSI from OBSS 3 has a minimum value, and STA 3 is listed in the row "Min RSSI" of the column "OBSS 3".

In brief, the table illustrated in FIG. 8 lists a STA for which an RSSI from each of the OBSS's becomes minimum or maximum on the basis of the measurement report frame that the AP has received from each of the STAs under control. A table having the structure above reflects a rough positional relationship among each of the STAs under the control of an AP, OBSS's, and the AP, and can also be said to reflect degrees of interference that each of the STAs under the control of the AP receives from the OBSS's.

Note that under a communication environment where the transmittance of radio waves is uniform, the RSSI is almost proportional to a distance between transceivers. Therefore, a table that is constructed on the basis of RSSI's from OBSS's, as illustrated in FIG. 8, can be said to indicate a positional relationship among each of the STAs under the control of an AP, the OBSS's, and the AP. On the other hand, under a communication environment where an obstacle having a low transmittance of radio waves (such as a screen door, a window glass, or the like) is distributed, there is a possibility that an RSSI that is lower than an RSSI to be expected from an actual distance will be measured for a STA that an OBSS signal arrives at via the obstacle. However, even if a table is constructed on the basis of an RSSI that does not reflect an actual positional relationship with a STA or an OBSS due to the presence of the obstacle, it is thought that no problem arises in the viewpoint of avoiding interference with an OBSS signal and realizing SR transmission.

Figure 9:
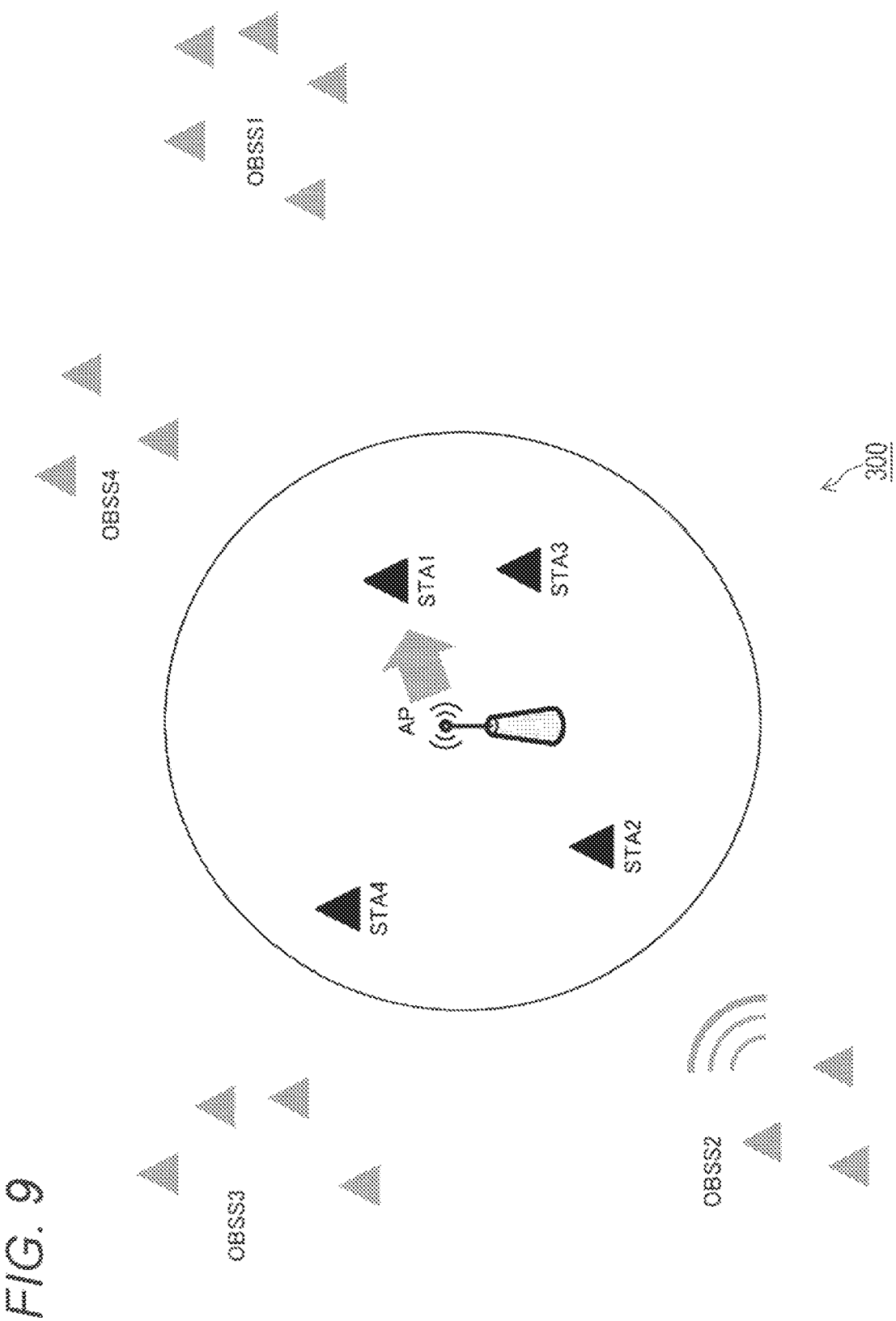
FIG. 9 is a diagram explaining an example of a method in which the AP realizes SR transmission based on OBSS-PD.
Figure 10:
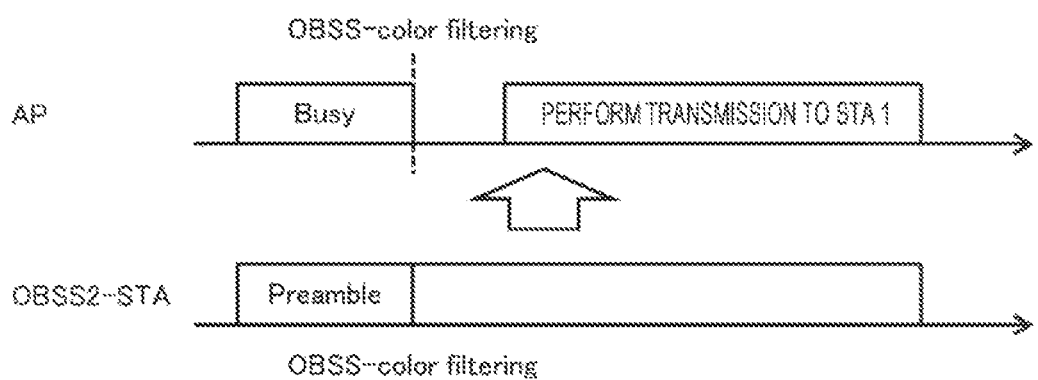
FIG. 10 illustrates an example of a signal transmission sequence at a time when the AP realizes SR transmission based on OBSS-PD.

FIG. 9 explains an example of a method in which an AP utilizes the table illustrated in FIG. 8 so as to realize SR transmission based on OBSS-PD in the wireless LAN system 300 illustrated in FIG. 3. Furthermore, FIG. 10 illustrates an example of a signal transmission sequence at a time when a signal has been transmitted from OBSS 2 (note that a horizontal axis is a time axis).

When a signal has arrived from OBSS 2, the AP is temporarily set to a busy state, and stands by for transmission. At this time, when the AP detects that the field "BSS Color" in a PHY header of a frame received from OBSS 2 is available and that the received signal is a signal that has arrived from OBSS 2 (OBSS Color filtering), the AP makes an attempt to realize SR transmission based on OBSS-PD (by setting an appropriate OBSS-PD threshold, for example, by increasing an OBSS-PD threshold). In other words, the AP refers to the category "Min RSSI" of OBSS 2 in the table illustrated in FIG. 8, and senses that an OBSS 2 signal having a minimum RSSI arrives at STA 1 at this point in time. Accordingly, the AP can determine to perform SR transmission to STA 1 for which interference received from OBSS 2 is smaller than interference of the other STAs because STA 1 is located apart from OBSS 2.

Figure 11:
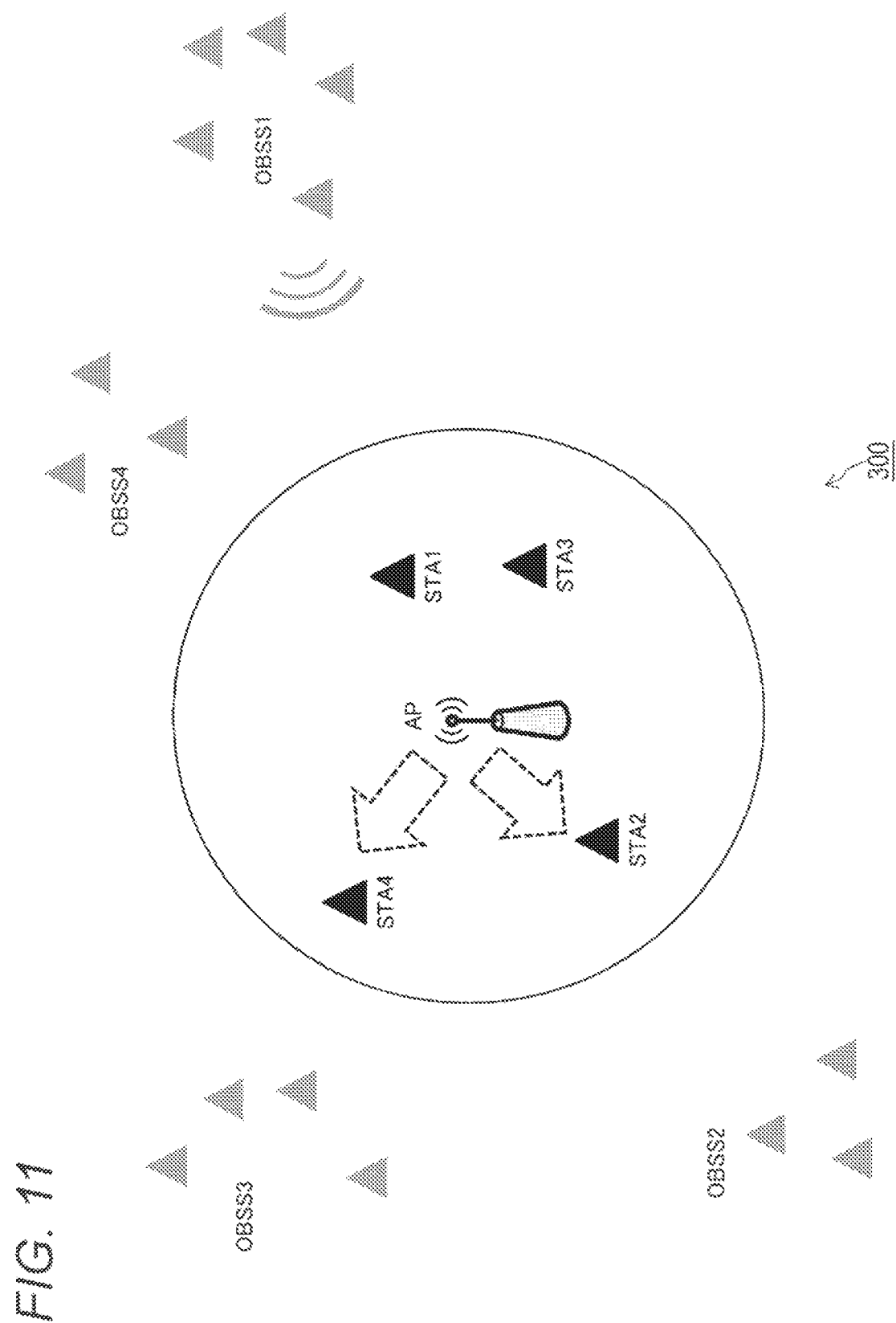
FIG. 11 is a diagram explaining another example of the method in which the AP realizes SR transmission based on OBSS-PD.
Figure 12:
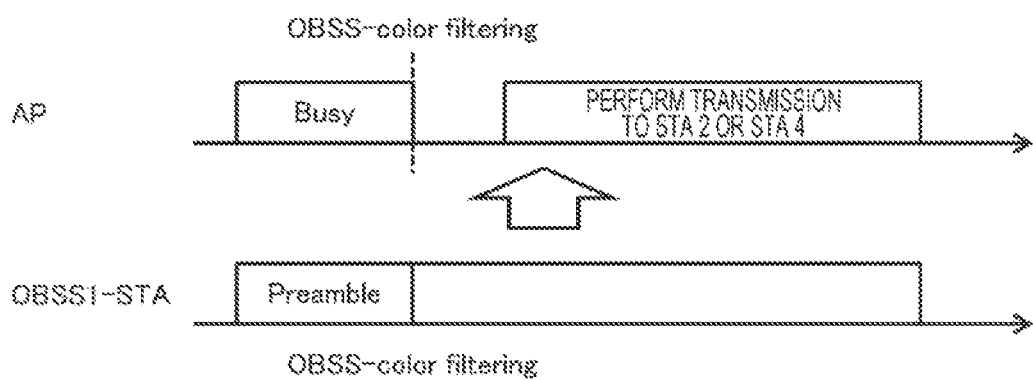
FIG. 12 illustrates an example of a signal transmission sequence at a time when the AP realizes SR transmission based on OBSS-PD.

Furthermore, FIG. 11 explains another example of the method in which the AP utilizes the table illustrated in FIG. 8 so as to realize SR transmission based on OBSS-PD in the wireless LAN system 300 illustrated in FIG. 3. FIG. 12 illustrates an example of a signal transmission sequence at a time when a signal has been transmitted from OBSS 1 (note that a horizontal axis is a time axis). The AP is temporarily set to a busy state, and stands by for transmission. The AP also refers to a PHY header of a received frame, and detects that the received signal is a signal that has arrived from OBSS 1. Then, the AP refers to the category "Min RSSI" of OBSS 1 in the table illustrated in FIG. 8, and senses that an OBSS 1 signal having a minimum RSSI arrives at STA 2 and STA 4 at this point in time. Accordingly, the AP can determine to perform SR transmission to STA 2 or STA 4 because STA 2 and STA 4 are located apart from OBSS 1. At this time, the AP may determine which of STA 2 and STA 4 transmission is to be performed on in accordance with a certain standard such as an original queue sequence or a priority order.

Figure 13:
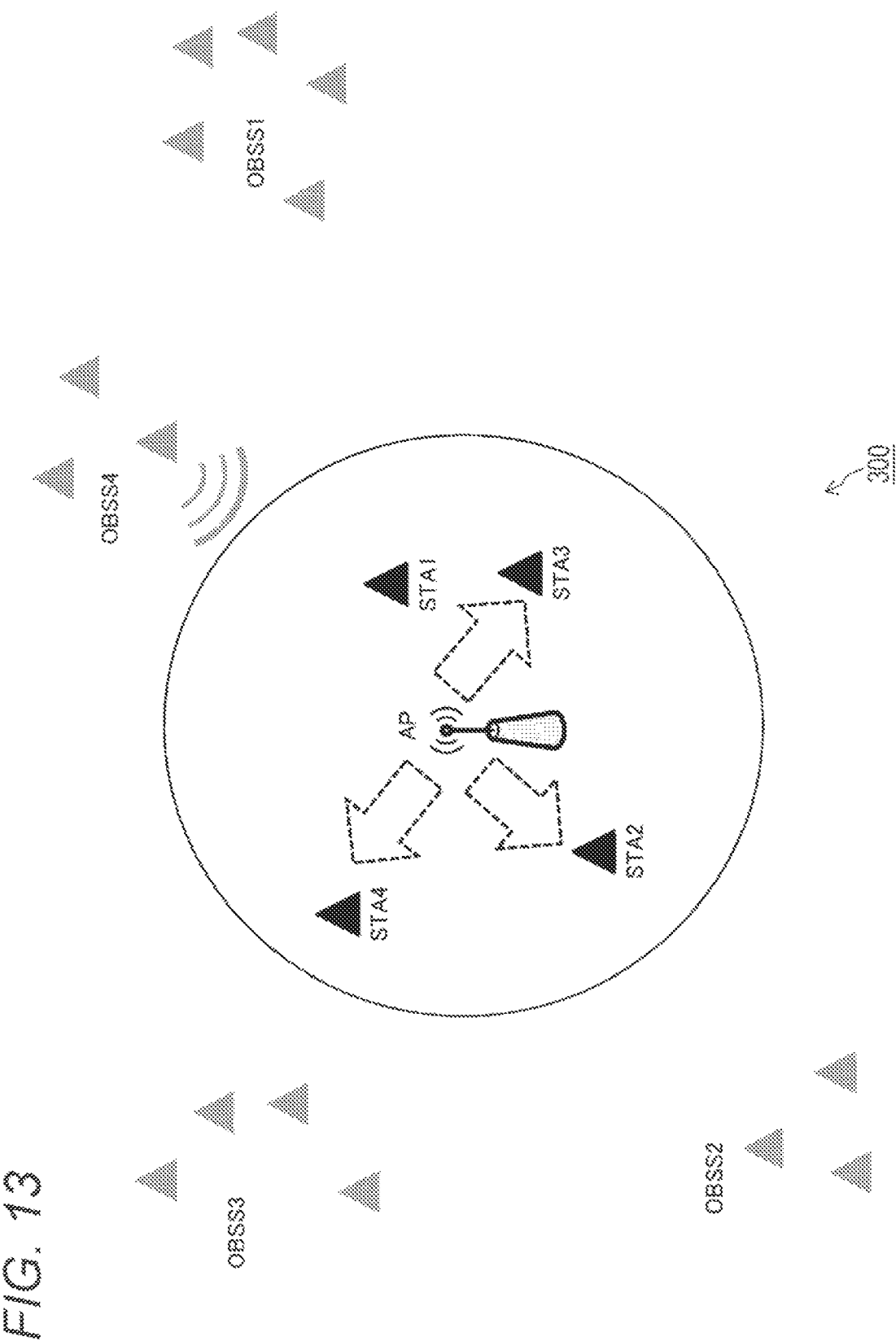
FIG. 13 is a diagram explaining another example of the method in which the AP realizes SR transmission based on OBSS-PD.
Figure 14:
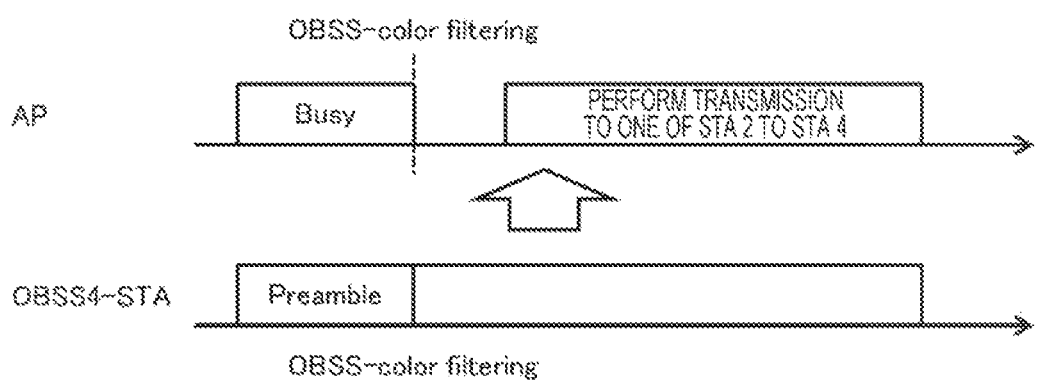
FIG. 14 illustrates an example of a signal transmission sequence at a time when the AP realizes SR transmission based on OBSS-PD.

Furthermore, in a method for configuring a table on the basis of the measurement report frames received from STAs under control, it is also assumed that an OBSS for which the category "Min RSSI" becomes blank exists, for example, as illustrated as OBSS 4 in the table illustrated in FIG. 8. In such a case, the AP may make an attempt to perform SR transmission to one of STAs that an OBSS 4 signal that does not have a maximum RSSI arrives at. In a case where OBSS 4 is transmitting a signal (see FIGS. 13 and 14), the AP is temporarily set to a busy state, and stands by for transmission. The AP also refers to a PHY header of a received frame, and detects that the received signal is a signal that has arrived from OBSS 4. Then, the AP refers to the category "Min RSSI" of OBSS 4 in the table illustrated in FIG. 8, and fails to sense a STA that an OBSS 4 signal having a minimum RSSI arrives at at this point in time. However, the AP refers to the category "Max RSSI" of OBSS 4 in the same table, and can discover that STA 1 is located closest to OBSS 4. Accordingly, the AP can determine to perform SR transmission to a STA other than STA 1, namely, one of STA 2 to STA 4. At this time, the AP may determine which of STA 2 to STA 4 transmission is to be performed on in accordance with a certain standard such as an original queue sequence or a priority order.

Figure 15:
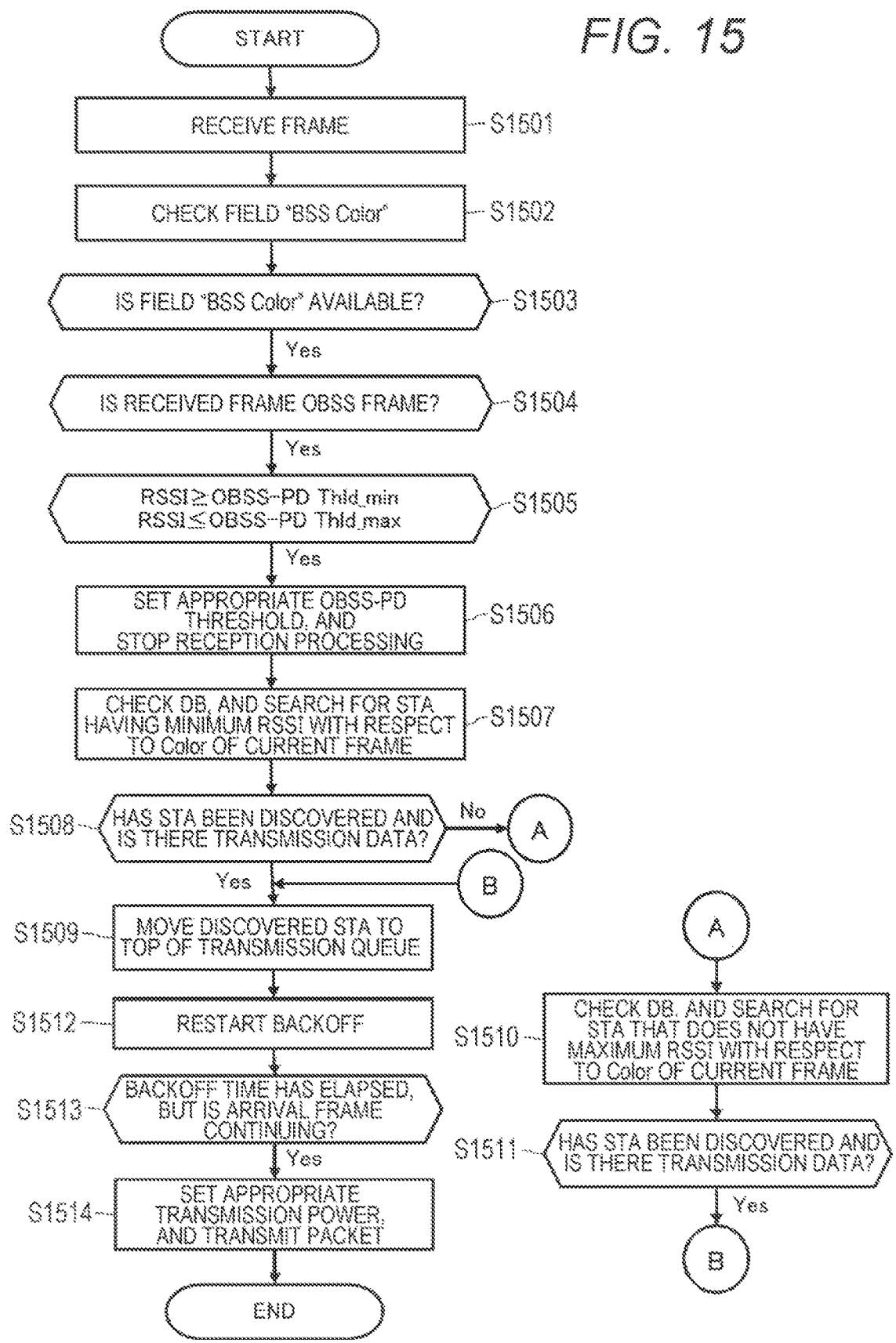
FIG. 15 is a flowchart illustrating a processing procedure in which the AP realizes SR transmission based on OBSS-PD.

FIG. 15 illustrates a processing procedure in which an AP realizes SR transmission based on OBSS-PD by utilizing the table illustrated in FIG. 8 (that has been constructed on the basis of the measurement reports of reception power from STAs under control) in the form of a flowchart.

Upon receipt of a frame (step S1501), the AP checks the field "BSS Color" in a PHY header of the frame (step S1502).

First, the AP checks whether or not the field "BSS Color" in the PHY header is available (step S1503). In a case where a transmission source of the frame does not conform to IEEE 802.11ax, the field "BSS Color" does not exist in the PHY header, and in other words, the field "BSS Color" is not available.

On the other hand, in a case where the field "BSS Color" in the PHY header is available (Yes in step S1503), the AP further checks whether or not the received frame is a frame that has arrived from an OBSS on the basis of whether or not a value of the BSS Color is different from a value of the AP (step S1504).

Then, in a case where the received frame is a frame that has arrived from the OBSS (Yes in step S1504), when the AP confirms that an RSSI of a signal of the OBSS is greater than or equal to a minimum value (OBSS-PD ThId_min) of an OBSS-PD threshold and is less than or equal to a maximum value (OBSS-PD ThId_max) of the OBSS-PD threshold (Yes in step S1505), the AP sets an appropriate OBSS-PD threshold, and also stops processing for receiving the OBSS frame (step S1506).

Next, the AP checks a database (for example, the table illustrated in FIG. 8 that has been constructed on the basis of the measurement reports of reception power from STAs under control), and searches for a STA having a minimum RSSI with respect to a BSS Color (identified in step S1503) of an OBSS signal that has currently arrived (step S1507).

Here, in a case where a STA having a minimum RSSI with respect to the BSS Color of a current arrival frame has been discovered and the AP has transmission data for the STA (Yes in step S1508), the AP moves the discovered STA to the top of a transmission queue (step S1509).

On the other hand, in a case where a STA having a minimum RSSI with respect to the BSS Color of the current arrival frame has not been discovered (No in step S1508), the AP further checks the database, and searches for a STA that does not exist in the category "Max RSSI" with respect to the BSS Color of the current arrival frame (step S1510).

Then, in a case where a STA that does not exist in the category "Max RSSI" with respect to the BSS Color of the current arrival frame has been discovered and the AP has transmission data for the STA (Yes in step S1511), the AP moves the discovered STA to the top of a transmission queue (step S1509).

Thereafter, the AP restarts backoff (step S1512). Then, in a case where a backoff time has elapsed but the frame that has arrived in step S1501 has not yet been finished (Yes in step S1513), the AP sets an appropriate transmission power, and transmits a packet (step S1514).

As described above, when the AP performs downlink SR transmission based on OBSS-PD, the AP uses an RSSI of an OBSS signal of each of the STAs under control as information for appropriately selecting a transmission destination. The RSSI is information that can almost directly indicates an influence of interference that a STA receives from an OBSS, and the AP can select a more appropriate transmission destination. However, the AP needs a minimum sequence (overhead) to exchange information relating to the RSSI of the OBSS with each of the STAs under control in order to realize downlink SR transmission based on OBSS-PD.

Example 2

In Example 2, when the AP performs downlink SR transmission based on OBSS-PD, the AP uses information relating to an angle of arrival (AoA) as information for appropriately selecting a transmission destination. The AoA itself does not directly indicate an influence of an interference signal. However, an influence of interference that a STA receives from an OBSS also changes according to a degree of similarity in the AoA to an OBSS signal, and therefore the AP can utilize the AoA as information for selecting a candidate for the transmission destination.

Then, the AP uses the measurement of AoA's of a BSS signal and the OBSS signal by spontaneously using a directional antenna without obtaining information such as the OBSS RSSI information (described above) from each of the STAs under control so as to be able to generate a table that reflects a rough positional relationship among each of the STAs under control, OBSS's, and the AP. This enables exchange of information with the STAs or the like to be omitted. Such a table reflects a rough positional relationship between the STAs and the OBSS's, and can also be said to reflect degrees of interference that each of the STAs under the control of the AP receives from the OBSS's.

Figure 16:
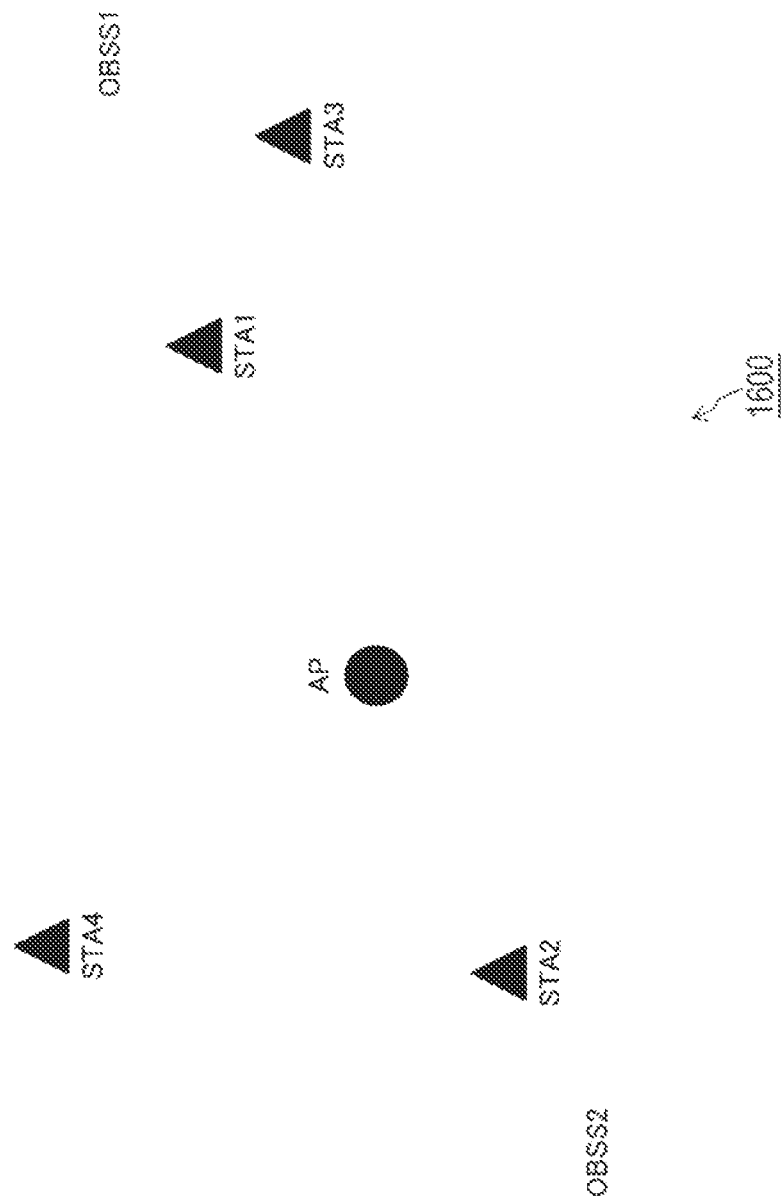
FIG. 16 illustrates an example of a configuration of a wireless LAN system 1600.

In a wireless LAN system 1600 illustrated in FIG. 16, an AP configures a single BSS together with STA 1 to STA 4 under control (that are not APs). Furthermore, two OBSS's, OBSS 1 and OBSS 2, are adjacent to this BSS. The AP can obtain AoA's of STA 1 to STA 4 under control, OBSS 1, and OBSS 2 by using AoA measurement by spontaneously using a directional antenna. The AP uses MA processing that is similar to MA processing illustrated in FIG. 5 so as to reduce the effectiveness of a deviation in reception power due to fading and shadowing, and obtains an average AoA of STA 1 to STA 4, OBSS 1, and OBSS 2. However, the AP may obtain AoA's of each of the STAs under control and the OBSS's by using an arbitrary method other than spontaneous measurement.

Figure 17:
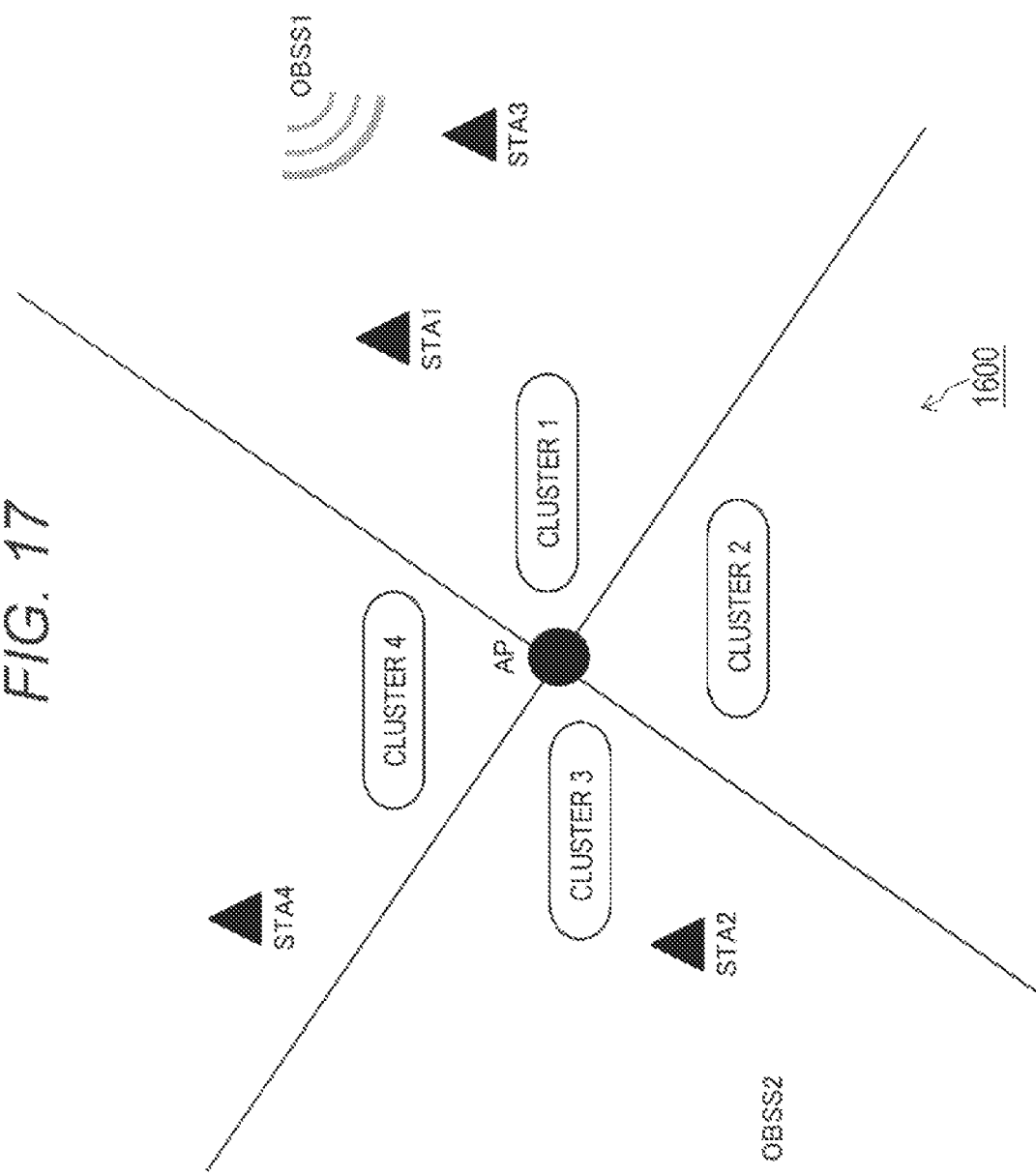
FIG. 17 illustrates a result of performing clustering processing on the wireless LAN system 1600 illustrated in FIG. 16.

After data of the AoA becomes available, the AP divides a space into a plurality of clusters (four clusters 1 to 4 in the illustrated example), as illustrated in FIG. 17, performs clustering processing for grouping STAs and an OBSS that have a similar AoA into the same cluster, and classifies the wireless LAN system 1600 each of the STAs and the OBSS's into clusters different from each other.

As described above, the AP can generate a table in which the STAs under control and the OBSS's have been classified into clusters 1 to 4 on the basis of the AoA, as illustrated in FIG. 18. AoA's of signals that arrive at the AP from STA 1, STA 3, and OBSS 1 are similar to each other, and therefore STA 1, STA 3, and OBSS 1 are grouped into cluster 1. Furthermore, AoA's of signals that arrive at the AP from STA 2 and OBSS 2 are similar to each other, and therefore STA 2 and OBSS 2 are grouped into cluster 3. On the other hand, there are neither STAs nor OBSS's that belong to cluster 2, and only STA 4 exists in cluster 4. A STA and an OBSS in the same cluster mean to have a similar angle of arrival at the AP, and it is also understood from FIG. 17 that the STA and the OBSS in the same cluster are physically close to each other. In contrast, it is also understood from FIG. 17 that there is a possibility that a STA and an OBSS that respectively belong to clusters in which angles of arrival at the AP are located on sides opposite to each other are physically located apart from each other.

For example, when OBSS 1 is transmitting a signal, as illustrated in FIG. 17, the AP can understand that STA 1 and STA 3 belong to cluster 1 serving as the same cluster as a cluster that OBSS 1 belongs to, by searching the table illustrated in FIG. 18. Accordingly, because there is a possibility that OBSS 1 is physically close to each of STA 1 and STA 3, the AP may avoid transmission to STA 1 and STA 3, and may perform SR transmission to STA 2 that belongs to cluster 3 that is located at an AoA opposite to an AoA of cluster 1.

Note that FIG. 17 illustrates an example where 360 degrees around the AP are equally divided into four clusters at each AoA of 90 degrees, but do not need to be divided into clusters at each identical AoA. For example, a direction in which OBSS's and STAs exist in high density may be divided into clusters at each narrow AoA. In contrast, in a direction in which OBSS's and STAs exist in low density, the STAs and the OBSS's may be grouped into a single cluster by using a wide AoA. Furthermore, cluster division may be performed in such a way that an almost equal number of OBSS's and STAs are accommodated in each of the clusters, or cluster division may be performed in such a way that OBSS's are distributed.

Furthermore, FIGS. 17 and 18 illustrate an example where the circumference of the AP is divided into four clusters, but the circumference of the AP can be divided into three or less clusters, or may be divided into five or more clusters.

In brief, the table illustrated in FIG. 18 lists clusters obtained by performing clustering processing on STAs and OBSS's on the basis of an angle of arrival at the AP. A STA and an OBSS in the same cluster have a similar AoA, and therefore the STA and the OBSS are physically close to each other. There is a possibility that an influence of interference is significant. In contrast, a STA and an OBSS that respectively belong to clusters in which angles of arrival at the AP are located opposite to each other are physically located apart from each other, and there is a possibility that an influence of interference is small. Accordingly, the cluster table described above reflects a rough positional relationship among each of the STAs under the control of an AP, OBSS's, and the AP, and can also be said to reflect degrees of interference that each of the STAs under the control of the AP receives from the OBSS's.

Note that radio waves that arrive at the AP from a STA or an OBSS are not limited to direct waves, and there is a possibility that the radio waves are reflected waves that have been reflected by a wall or the like or other indirect waves. If arrival waves of the AP are not direct waves, a STA or an OBSS serving as a signal source of the arrival waves does not exist in a direction of an AoA measured in the AP, and a table obtained by performing clustering processing on the basis of the arrival waves does not necessarily reflect an actual positional relationship with the STA or the OBSS. However, if radio waves propagate through the same route in a going path and a returning path and sending-out is performed in a direction of an AoA, it can be assumed that a signal is transmitted to a corresponding party. Accordingly, even if a cluster table that does not reflect an actual positional relationship is constructed on the basis of an AoA of arrival waves including indirect waves, it is thought that no problem arises in the viewpoint of avoiding interference with an OBSS signal and realizing SR transmission.

Figure 19:
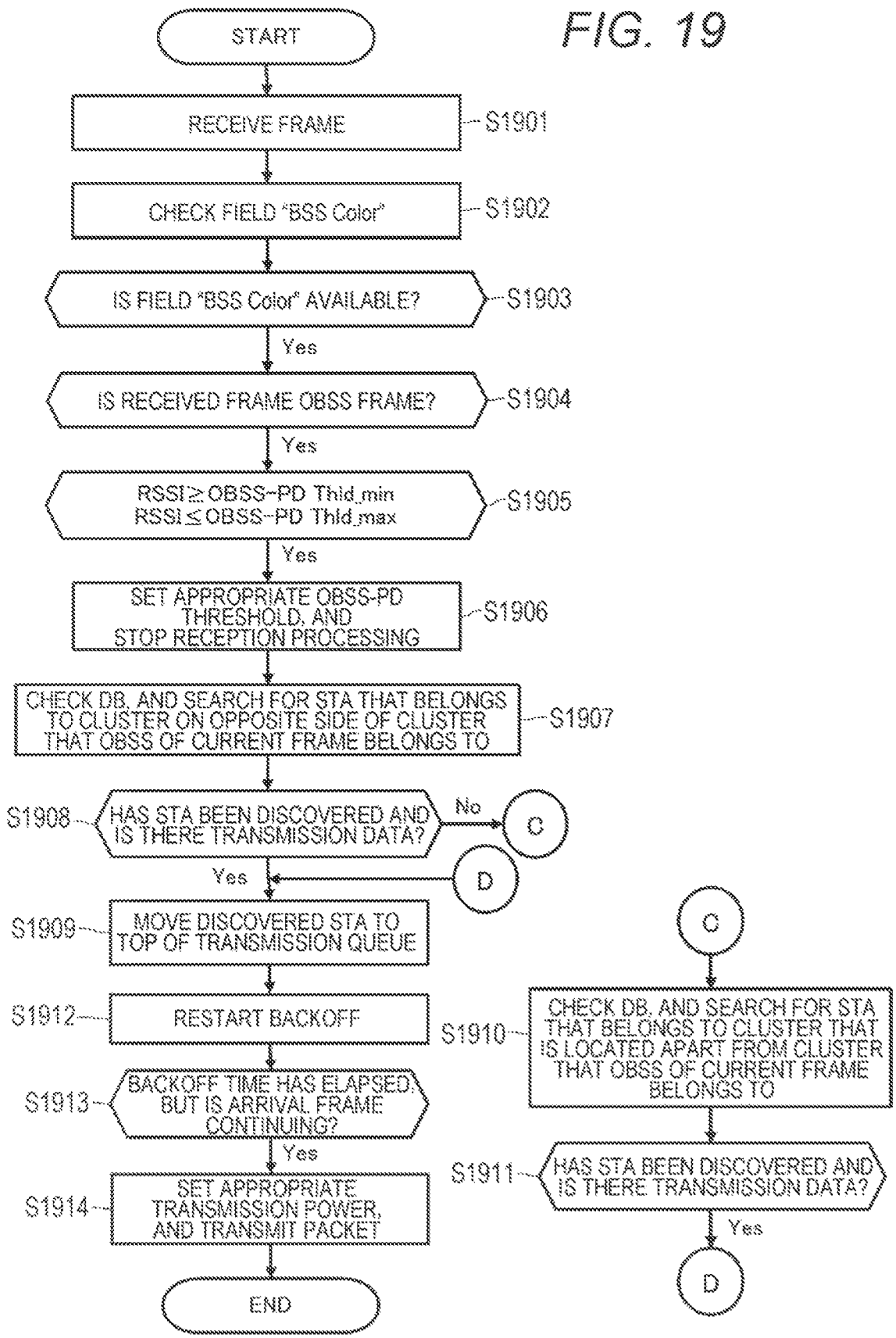
FIG. 19 is a flowchart illustrating a processing procedure in which the AP realizes SR transmission based on OBSS-PD.

FIG. 19 illustrates a processing procedure in which an AP realizes SR transmission based on OBSS-PD by utilizing the table illustrated in FIG. 18 (that has been constructed on the basis of AoA's of a STA and an OBSS) in the form of a flowchart.

Upon receipt of a frame (step S1901), the AP checks the field "BSS Color" in a PHY header of the frame (step S1902).

First, the AP checks whether or not the field "BSS Color" in the PHY header is available (step S1903). In a case where a transmission source of the frame does not conform to IEEE 802.11ax, the field "BSS Color" does not exist in the PHY header, and in other words, the field "BSS Color" is not available.

On the other hand, in a case where the field "BSS Color" in the PHY header is available (Yes in step S1903), the AP further checks whether or not the received frame is a frame that has arrived from an OBSS on the basis of whether or not a value of the BSS Color is different from a value of the AP (step S1904).

Then, in a case where the received frame is a frame that has arrived from the OBSS (Yes in step S1904), when the AP confirms that an RSSI of a signal of the OBSS is greater than or equal to a minimum value (OBSS-PD ThId_min) of an OBSS-PD threshold and is less than or equal to a maximum value (OBSS-PD ThId_max) of the OBSS-PD threshold (Yes in step S1905), the AP sets an appropriate OBSS-PD threshold, and also stops processing for receiving the OBSS frame (step S1906).

Next, the AP checks a database (for example, the table illustrated in FIG. 18 that has been constructed by performing clustering on a STA and an OBSS on the basis of an AoA), and searches for a STA that belongs to a cluster that is located on an opposite side of a cluster that an OBSS from which an interference signal has currently arrived belongs to (step S1907).

Here, in a case where a STA that belongs to a cluster that is located on an opposite side of the cluster that the OBSS from which an interference signal has currently arrived belongs to has been discovered and the AP has transmission data for the STA (Yes in step S1908), the AP moves the discovered STA to the top of a transmission queue (step S1909).

On the other hand, in a case where a STA that belongs to a cluster that is located on an opposite side of the cluster that the OBSS from which an interference signal has currently arrived belongs to has not been discovered (No in step S1908), the AP further checks the database, and searches for a STA that belongs to a cluster that is different from (is located as far as possible from) the cluster that the OBSS from which an interference signal has currently arrived belongs to (step S1910).

Then, in a case where a STA that belongs to a cluster that is different from (is located as far as possible from) the cluster that the OBSS from which an interference signal has currently arrived belongs to has been discovered and the AP has transmission data for the STA (Yes in step S1911), the AP moves the discovered STA to the top of a transmission queue (step S1909).

Thereafter, the AP restarts backoff (step S1912). Then, in a case where a backoff time has elapsed but the frame that has arrived in step S1901 has not yet been finished (Yes in step S1913), the AP sets an appropriate transmission power, and transmits a packet (step S1914).

As described above, when the AP performs downlink SR transmission based on OBSS-PD, the AP uses information relating to AoA's of STAs under control and OBSS's as information for appropriately selecting a transmission destination. The AoA itself does not directly indicate an influence of an interference signal. However, an influence of interference that a STA receives from an OBSS also changes according to a degree of similarity in the AoA to an OBSS signal, and therefore the AP can utilize the AoA as information for selecting a candidate for the transmission destination. Furthermore, the AP can measure AoA's of signals that arrive from the STAs under control and the OBSS's by spontaneously using a directional antenna. Accordingly, the AP can select an appropriate transmission destination on the basis of information relating to the AoA without exchanging information with the STAs under control, or the like.

Note that the method described in Example 2 for performing downlink SR transmission based on OBSS-PD can also be used in combination with the method described in Example 1.

Figure 20:
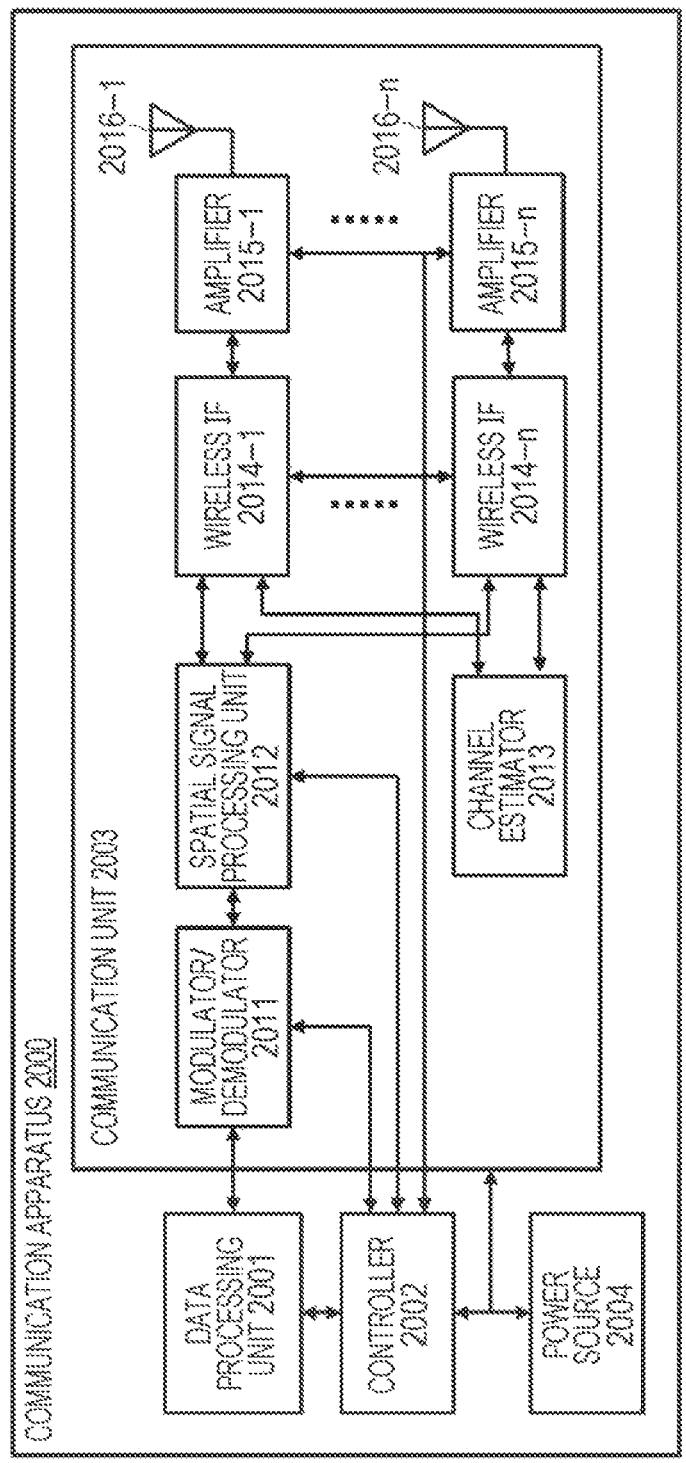
FIG. 20 illustrates an example of a functional configuration of a communication apparatus 2000.

FIG. 20 illustrates an example of a functional configuration of a communication apparatus 2000 that performs a communication operation as an AP or a STA in Examples 1 and 2 described above. It should be understood that both the AP and the STA have a similar basic configuration.

The communication apparatus 2000 includes a data processing unit 2001, a controller 2002, a communication unit 2003, and a power source 2004. Furthermore, the communication unit 2001 further includes a modulator/demodulator 2011, a spatial signal processing unit 2012, a channel estimator 2013, a wireless interface (IF) 2014, an amplifier 2015, and an antenna 2016. However, a set of the wireless interface 2014, the amplifier 2015, and the antenna 2016 may configure a single transmission/reception branch, and the communication unit 2001 may include two or more transmission/reception branches. Furthermore, a function of the amplifier 2015 is included in the wireless interface 2014 in some cases.

At the time of transmission of data that has been input from a protocol upper layer (not illustrated), the data processing unit 2001 generates a packet for wireless transmission from the data, performs processing such as the addition of a header for MAC processing or the addition of an error detection code, and provides data after processing to the modulator/demodulator 2011. Furthermore, at the time of reception at which an input is performed from the modulator/demodulator 2011, the data processing unit 2001 performs analysis of a MAC header, the detection of a packet error, reordering processing, and the like, and provides data after processing to a protocol upper layer of the data processing unit 2001.

The controller 2002 communicates information with each unit in the communication apparatus 2000. Furthermore, the controller 2002 performs parameter setting in the modulator/demodulator 2011 and the spatial signal processing unit 2012 and packet scheduling (the management of a transmission queue, and the like) in the data processing unit 2001. Furthermore, the controller 2002 performs parameter setting and transmission power control in the wireless interface 2014 and the amplifier 2015.

In a case where the communication apparatus 2000 operates as an AP, the controller 2002 controls SR transmission based on an OBSS-PD threshold.

Furthermore, in a case where the communication apparatus 2000 operates as an AP in Example 1, the controller 2002 processing for transmitting a measurement request frame to STAs under control, sums a measurement report frame transmitted from each of the STAs, and constructs a table or a database (see FIG. 8) that indicates a rough positional relationship among each of the STAs under control, OBSS's, and the AP by being used in RSSI information, on the basis of OBSS RSSI information. Then, when the controller 2002 detects an OBSS signal, the controller 2002 refers to the table or database described above, selects an appropriate STA on which SR transmission will be performed, and controls packet transmission in accordance with the processing procedure illustrated in FIG. 15.

Furthermore, in a case where the communication apparatus 2000 operates as a STA in Example 1, the controller 2002 stores a pair of an RSSI measured for each of the received OBSS signals and a BSS Color of each of the OBSS's (see FIG. 5). Then, upon receipt of a measurement request frame from the AP, the controller 2002 controls the transmission of a measurement report frame (see FIG. 7) storing OBSS RSSI information that includes a pair of a maximum value of an OBSS RSSI and corresponding color information and a pair of a minimum value of the OBSS RSSI and corresponding color information.

Furthermore, in a case where the communication apparatus 2000 operates as an AP in Example 2, the controller 2002 performs clustering processing on the basis of a measurement result of AoA's of signals that arrive from STAs under control and OBSS's, groups STAs and OBSS's having a similar AoA into a cluster, and constructs a table or a database (see FIG. 18) that indicates a rough positional relationship among each of the STAs under control, the OBSS's, and the AP by using clusters. Then, when the controller 2002 detects an OBSS signal, the controller 2002 refers to the table or database described above, selects an appropriate STA on which SR transmission will be performed, and controls packet transmission in accordance with the processing procedure illustrated in FIG. 19.

At the time of transmission, the modulator/demodulator 2011 performs encoding, interleaving, and modulation processing on an input data from the data processing unit 2001 in accordance with a coding and modulation method that has been set by the controller 2001, generates a data symbol stream, and provides the data symbol stream to the spatial signal processing unit 2012. Furthermore, at the time of reception, the modulator/demodulator 2011 performs processing, such as demodulation, deinterleaving, or decoding, that is inverse to processing at the time of transmission on an input from the spatial signal processing unit 2012 in accordance with a coding and modulation method set by the controller 2001, and provides data to the data processing unit 2001 or the controller 2002.

At the time of transmission, the spatial signal processing unit 2012 performs signal processing provided for spatial separation on an input from the modulator/demodulator 2011 as needed, and provides one or more obtained transmission symbol streams to respective wireless interfaces 2014. On the other hand, at the time of reception, the spatial signal processing unit 2012 performs signal processing on reception symbol streams that have been input from the respective wireless interfaces 2014, spatially resolves the streams as needed, and provides the streams to the modulator/demodulator 2011.

The channel estimator 2013 calculates complex channel gain information of a propagation path from preamble portions and training signal portions of input signals from the respective wireless interfaces 2014. Then, the calculated complex channel gain information is used in demodulation processing of the modulator/demodulator 2011 and spatial processing of the spatial signal processing unit 2012 via the controller 2002, so that spatial multiplex communication such as MIMO can be performed.

At the time of transmission, the wireless interface 2014 converts an input from the spatial signal processing unit 2012 into an analog signal, performs filtering and up-conversion to a carrier frequency, and sends out the analog signal to the antenna 2016 or the amplifier 2015. On the other hand, at the time of reception, the wireless interface 2014 performs processing, such as down-conversion or conversion into a digital signal, that is inverse to processing at the time of transmission on an input (a received signal having the carrier frequency) from the antenna 2016 or the amplifier 2015, and provides data to the spatial signal processing unit 2012 and the channel estimator 2013.

In a case where the communication apparatus 2000 operates as a STA in Example 1, the wireless interface 2014 includes a bank of MA filters to measure an RSSI of an OBSS signal and obtain a moving average of the RSSI.

At the time of transmission, the amplifier 2015 amplifies the analog signal that has been input from the wireless interface 2014 to a prescribed power, and sends out the analog signal to the antenna 2016. Furthermore, at the time of reception, the amplifier 2015 performs low-noise amplification on a received signal that has been input from the antenna 2016 to a prescribed power, and outputs the received signal to the wireless interface 2014. At least one of a function at the time of transmission or a function at the time of reception of the amplifier 2015 that is described above is included in the wireless interface 2014 in some cases.

In a case where the communication apparatus 2000 operates as an AP in Example 2, the antenna 2016 is a directional antenna, and the wireless interface 2014 measures AoA's of signals that arrive from STAs under control and OBSS's. Furthermore, the wireless interface 2014 includes a bank of MA filters to obtain a moving average of the AoA's.

The power source 2004 includes a battery power source or a fixed power source such as a commercial power source, and supplies power for driving to each of the units in the communication apparatus 2000.

Note that the communication apparatus 2000 can further include a function module other than illustrated units. However, this is not directly associated with the technology disclosed herein, and illustration and a description are omitted here.

According to the technology disclosed herein, the following effects are expected.

(1) STAs can report, to an AP, reception power measurement results from an OBSS, and the AP can perform a communication operation based on OBSS-PD by using these pieces of information, and can perform SR transmission to a STA having the smallest interference with the OBSS. Alternatively, the AP can perform a communication operation based on OBSS-PD by using information obtained by performing clustering processing on STAs under control and an OBSS on the basis of AoA's, and can transmit a signal to a STA that is estimated to belong to a cluster on an opposite side of a cluster of the OBSS and to be located apart from the OBSS. In brief, the AP can simply determine a STA that is unlikely to receive interference from the OBSS, and can increase an opportunity to perform transmission to a STA.

(2) The communication operation in (1) described above results in improvements in a spatial reuse rate based on OBSS-PD. Furthermore, the AP transmits a signal to a STA having the smallest interference with the OBSS, and this also results in improvements in a success rate of transmission.

(3) The AP can acquire more transmission opportunities, and this principally results in improvements in a downlink throughput in a wireless LAN system.

(4) The AP can obtain information required to realize downlink SR transmission based on OBSS-PD by exchanging minimum information with STAs under control (for example, by transmitting a measurement request frame and receiving a measurement report frame) or by performing minimum measurement (for example, the measurement of an AoA), and this results in a small overhead.

INDUSTRIAL APPLICABILITY

The technology disclosed herein has been described above in detail with reference to specified embodiments. However, it is obvious that those skilled in the art could make modifications or substitutions to the embodiments without departing from the gist of the technology disclosed herein.

The technology disclosed herein is suitably applicable to, for example, a wireless LAN system that conforms to the IEEE 802.11ax standard, but an application range of the technology disclosed herein is not limited to this. The technology disclosed herein is applicable to various network systems such as a wireless LAN system in which an AP performs downlink signal transmission to a STA while permitting interference or a wireless LAN system in which a terminal station (regardless of whether or not it is an AP or a STA) performs one-to-one signal transmission while permitting interference.

In brief, the technology disclosed herein has been described in the form of an example, and the content described herein is not to be construed to be restrictive. In order to determine the gist of the technology disclosed herein, the claims should be considered.

Note that the technology disclosed herein can also employ the configuration described below.

(1) A communication apparatus including:
a communication unit that transmits or receives a signal;
an information obtaining unit that obtains information relating to interference that each transmission destination candidate receives from an interference source; and
a controller that selects each of the transmission destination candidates on the basis of the information when an interference signal arrives.

(2) The communication apparatus described in (1) described above, in which the controller identifies whether or not the interference signal has arrived from an OBSS on the basis of BSS identification information described in a PHY header of a received frame.

(3) The communication apparatus described in (2) described above, in which the BSS identification information includes a BSS Color defined by IEEE 802.11.

(4) The communication apparatus described in any of (1) to (3) described above,
in which the communication apparatus operates as an access point, and
the information obtaining unit obtains the information relating to respective terminal stations serving as each of the transmission destination candidates in a local BSS and interference received from an OBSS serving as the interference source.

(5) The communication apparatus described in (4) described above,
in which when a reception power of an OBSS signal serving as the interference signal is less than or equal to a prescribed threshold, the controller selects one of the respective terminal stations in the local BSS on the basis of the information, and causes the signal to be transmitted.

(6) The communication apparatus described in any of (1) to (5) described above,
in which the controller selects a transmission destination candidate that the information indicates that is located farthest from the interference source that corresponds to the interference signal or is not located closest to the interference source.

(7) The communication apparatus described in any of (1) to (5) described above,
in which the information obtaining unit obtains the information relating to an intensity of a received signal from the interference source of each of the transmission destination candidates, and
the controller selects each of the transmission destination candidates on the basis of the intensity of the received signal from the interference source that corresponds to the interference signal.

(8) The communication apparatus described in (7) described above,
in which the controller selects a transmission destination candidate that the information indicates that has a lowest intensity of the received signal from the interference source that corresponds to the interference signal or does not have a highest intensity of the received signal from the interference source.

(9) The communication apparatus described in any of (7) and (8) described above,
in which the information obtaining unit obtains the information on the basis of a report relating to the intensity of the received signal from the interference source, the report being transmitted from each of the transmission destination candidates.

(10) The communication apparatus described in any of (7) to (9) described above,
in which the information obtaining unit obtains the information on the basis of a report relating to a measurement result of the intensity of the received signal from the interference source, the report being transmitted by each of the transmission destination candidates in response to a measurement request from a local station.

(11) The communication apparatus described in any of (7) to (10) described above,
in which the communication apparatus operates as an access point,
the information obtaining unit obtains the information relating to the intensity of the received signal of an OBSS signal in each terminal station serving as each of the transmission destination candidates in a local BSS, and
the controller manages the information of each of the terminal stations in association with BSS identification information of an OBSS.

(12) The communication apparatus described in (11) described above,
in which the information obtaining unit obtains, from each of the terminal stations, the information including the BSS identification information that indicates at least one of an OBSS having a maximum intensity of the received signal or an OBSS having a minimum intensity of the received signal.

(13) The communication apparatus described in any of (1) to (11) described above,
in which the information obtaining unit obtains the information relating to an angle of arrival of each of the transmission destination candidates and the interference source, and
the controller selects each of the transmission destination candidates on the basis of a relationship of the angle of arrival between the interference source that corresponds to the interference signal and each of the transmission destination candidates.

(14) The communication apparatus described in (13) described above,
in which the controller selects a transmission destination candidate that the information indicates that is most different in the angle of arrival from the interference source that corresponds to the interference signal or is not most similar in the angle of arrival to the interference source.

(15) The communication apparatus described in any of (13) and (14) described above,
in which the communication unit includes a directional antenna, and
the information obtaining unit obtains the information relating to the angle of arrival on the basis of a result of receiving signals from each of the transmission destination candidates and the interference source by using the directional antenna.

(16) The communication apparatus described in any of (13) to (15) described above, in which the communication apparatus operates as an access point, the information obtaining unit obtains the information relating to the angle of arrival of terminal stations serving as each of the transmission destination candidates in a local BSS and OBSS's, and the controller groups terminal stations and an OBSS that are similar in the angle of arrival into a cluster, and manages respective clusters in association with the BSS identification information of each of the OBSS's.

(17) A communication method including:

an information obtaining step of obtaining information relating to interference that each transmission destination candidate receives from an interference source; and a controlling step of selecting each of the transmission destination candidates on the basis of the information when an interference signal arrives.

(18) A communication apparatus that operates under a control of an access point, the communication apparatus including:

a controller that performs control to transmit, to the access point, information relating to an intensity of a received signal of an OBSS signal.

(18-1) The communication apparatus described in (18) described above, further including:

a measuring unit that identifies the OBSS signal on the basis of BSS identification information described in a PHY header of a received frame, and measures an intensity of a received signal of the OBSS signal.

(19) The communication apparatus described in (18) described above, in which the controller performs control to transmit, to the access point, the information that associates the intensity of the received signal of the OBSS signal with BSS identification information of an OBSS.

(20) The communication apparatus described in any of (18) and (19) described above, in which the controller performs control to transmit, to the access point, the information including the BSS identification information that indicates at least one of an OBSS having a maximum intensity of the received signal or an OBSS having a minimum intensity of the received signal.

(21) The communication apparatus described in any of (18) to (20) described above, in which the controller causes a report frame to be transmitted to the access point in response to a request frame from the access point, the report frame including the information.

(22) A communication method in a communication apparatus that operates under a control of an access point, the communication method including:

a controlling step of performing control to transmit, to the access point, information relating to an intensity of a received signal of an OBSS signal.

REFERENCE SIGNS LIST

100 Wireless LAN system
101 BSS
102 OBSS
300 Wireless LAN system
501 BSS Color detector
502-1, 502-2, . . . ,502-N MA filter
503 OBSS RSSI table
504 Rearrangement/search unit
1600 Wireless LAN system
2000 Communication apparatus
2001 Data processing unit
2002 Controller
2003 Communication unit
2004 Power source
2011 Modulator/demodulator
512 Spatial signal processing unit
2013 Channel estimator
2014 Wireless interface
2015 Amplifier
2016 Antenna

The invention claimed is:

1. A communication apparatus, comprising:
circuitry configured to:
  transmit a measurement request frame;
  receive a measurement report frame that includes first information, wherein the first information corresponds to interference received by each transmission destination candidate of a plurality of transmission destination candidates from an interference source;
  select, upon arrival of an interference signal, a transmission destination candidate of the plurality of transmission destination candidates based on the first information;
  obtain second information, wherein
    the second information is related to an intensity of a signal of each transmission candidate of the plurality of transmission destination candidates, and
    the signal of each transmission candidate of the plurality of transmission destination candidates is received from the interference source;
  select each transmission candidate of the plurality of transmission destination candidates based on the intensity of the signal of each of the plurality of transmission destination candidates, wherein the received signal corresponds to the interference signal;
  obtain third information related to an intensity of an overlapping basis service set (OBSS) signal in each terminal station of a plurality of terminal stations, wherein each terminal station serves as one of the plurality of transmission destination candidates in a local basic service set (BSS);
  manage the third information of each terminal station of the plurality of terminal stations in association with BSS identification information of an OBSS; and
  obtain, from each terminal station of the plurality of terminal stations, fourth information that includes the BSS identification information, wherein
    the BSS identification information indicates one of a first OBSS signal of a plurality of OBSS signals with a first intensity or a second OBSS signal of the plurality of OBSS signals with a second intensity,
    the first intensity of the first OBSS signal is maximum among intensities of the plurality of OBSS signals, and
    the second intensity of the second OBSS signal is minimum among the intensities of the plurality of OBSS signals.

2. The communication apparatus according to claim 1, wherein
  the circuitry is further configured to identify the arrival of the interference signal from the OBSS based on the BSS identification information, and
  the BSS identification information is in a PHY header of the received measurement report frame.

3. The communication apparatus according to claim 2, wherein the BSS identification information includes a BSS color defined by IEEE 802.11.

4. The communication apparatus according to claim 1, wherein
the communication apparatus is configured to operate as an access point, and
the interference signal is received from the OBSS that serves as the interference source.

5. The communication apparatus according to claim 4, wherein the circuitry is further configured to:
select a terminal station of the plurality of terminal stations in the local BSS based on the second information and a reception power of the OBSS signal that serves as the interference signal, wherein the reception power is less than or equal to a specific threshold; and
transmit the OBSS signal.

6. The communication apparatus according to claim 1, wherein
the circuitry is further configured to select the transmission destination candidate from the plurality of transmission destination candidates based on fifth information, and
the fifth information indicates that a distance of the selected transmission destination candidate from the interference source is maximum among distances of the plurality of transmission destination candidates from the interference source.

7. The communication apparatus according to claim 1, wherein
the circuitry is further configured to select the transmission destination candidate from the plurality of transmission destination candidates based on fifth information,
the fifth information indicates that an intensity of a specific signal associated with the selected transmission destination candidate is lowest among intensities of a plurality of signals of the plurality of transmission destination candidates received from the interference source,
the plurality of signals includes the interference signal, and
the interference signal is received from the interference source.

8. The communication apparatus according to claim 1, wherein
the circuitry is further configured to obtain fifth information based on a report related to the intensity of received signal of each of the plurality of transmission destination candidates, and
each of the plurality of transmission destination candidates transmits the report.

9. The communication apparatus according to claim 1, wherein
the circuitry is further configured to obtain fifth information based on a report related to a measurement result of the intensity of the received signal of each of the plurality of transmission destination candidates, and
each of the plurality of transmission destination candidates transmit the report based on a measurement request from a local station.

10. The communication apparatus according to claim 1, wherein
the circuitry is further configured to:
obtain fifth information related to an angle of arrival between each of the plurality of transmission destination candidates and the interference source; and
select each transmission destination candidate of the plurality of transmission destination candidates based on a relationship of the angle of arrival between the interference source and each of the plurality of transmission destination candidates, and
the interference source corresponds to the interference signal.

11. The communication apparatus according to claim 10, wherein
the circuitry is further configured to select a first transmission destination candidate from the plurality of transmission destination candidates based on the fifth information, and
the fifth information indicates that the first transmission destination candidate is one of most different in the angle of arrival of the interference signal from the interference source or not most similar in the angle of arrival of the interference signal from the interference source.

12. The communication apparatus according to claim 10, wherein
the circuitry further includes a directional antenna configured to obtain the first information, and
the circuitry is further configured to obtain the fifth information based on a result of a plurality of signals received from the plurality of transmission destination candidates and the interference source.

13. The communication apparatus according to claim 10, wherein
the circuitry is further configured to:
obtain sixth information related to an angle of arrival of the plurality of terminal stations and a plurality of overlapping basic service set (OBSS), wherein the plurality of terminal stations serve as the plurality of transmission destination candidates in a local BSS;
group the plurality of terminal stations and a specific OBSS of the plurality of OBSS into a cluster, wherein the plurality of terminal stations and the specific OBSS are same in the angle of arrival; and
manage respective clusters in association with the BSS identification information of each of the plurality of OBSS.

14. A communication method, comprising:
transmitting, by circuitry, a measurement request frame;
receiving, by the circuitry, a measurement report frame that includes first information, wherein the first information corresponds to interference received by each transmission destination candidate of a plurality of transmission destination candidates from an interference source;
selecting, by the circuitry upon arrival of an interference signal, a transmission destination candidate of the plurality of transmission destination candidates based on the first information;
obtaining, by the circuitry, second information, wherein the second information is related to an intensity of a signal of each transmission candidate of the plurality of transmission destination candidates, and
the signal of each transmission candidate of the plurality of transmission destination candidates is received from the interference source;
selecting, by the circuitry, each transmission candidate of the plurality of transmission destination candidates based on the intensity of the signal of each of the plurality of transmission destination candidates, wherein the received signal corresponds to the interference signal;

obtaining, by the circuitry, third information related to an intensity of an overlapping basis service set (OBSS) signal in each terminal station of a plurality of terminal stations, wherein each terminal station serves as one of the plurality of transmission destination candidates in a local basic service set (BSS);

managing, by the circuitry, the third information of each terminal station of the plurality of terminal stations in association with BSS identification information of an OBSS; and obtaining, by the circuitry, from each terminal station of the plurality of terminal stations, fourth information that includes the BSS identification information, wherein the BSS identification information indicates one of a first OBSS signal of a plurality of OBSS signals with a first intensity or a second OBSS signal of the plurality of OBSS signals with a second intensity, the first intensity of the first OBSS signal is maximum among intensities of the plurality of OBSS signals, and the second intensity of the second OBSS signal is minimum among the intensities of the plurality of OBSS signals.

15. A communication apparatus, comprising:
circuitry configured to:
receive a measurement request frame; and
transmit, to an access point, a measurement report frame that includes information related to an intensity of a received signal of an overlapping basis service set (OBSS) signal, wherein
each transmission destination candidate of a plurality of transmission destination candidates corresponds to a terminal station of a plurality of terminal stations in a local basic service set (BSS),
the information includes BSS identification information,
the BSS identification information indicates one of a first OBSS signal of a plurality of OBSS signals with a first intensity or a second OBSS signal of the plurality of OBSS signals with a second intensity,
the first intensity of the first OBSS signal is maximum among intensities of the plurality of OBSS signals, and
the second intensity of the second OBSS signal is minimum among the intensities of the plurality of OBSS signals.

16. The communication apparatus according to claim 15, wherein the circuitry is further configured to transmit, to the access point, the information that associates the intensity of the received signal of the OBSS signal with the BSS identification information of an overlapping basic service set (OBSS).

17. The communication apparatus according to claim 15, wherein
the circuitry is further configured to transmit, to the access point, the information that includes the BSS identification information,
the BSS identification information indicates at least one of a first overlapping basic service set (OBSS) of a plurality of OBSS or a second OBSS of the plurality of OBSS, an intensity of the first OBSS is maximum among intensities of the plurality of OBSS, and
an intensity of the second OBSS is minimum among the intensities of the plurality of OBSS.

* * * * *